Jan. 20, 1931.   J. E. STIEGELMEYER   1,789,663
AUTOMATIC TRAIN CONTROL
Filed Aug. 3, 1926    12 Sheets-Sheet 3

INVENTOR.
John E. Stiegelmeyer,
BY
Hood + Hahn
ATTORNEYS

Jan. 20, 1931.  J. E. STIEGELMEYER  1,789,663
AUTOMATIC TRAIN CONTROL
Filed Aug. 3, 1926   12 Sheets-Sheet 4
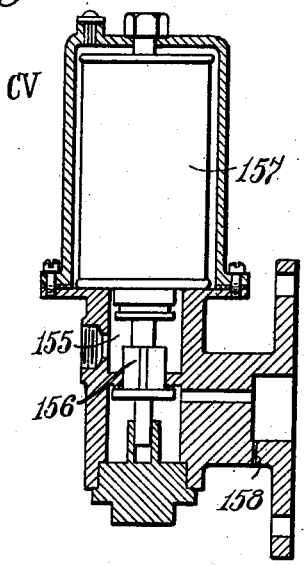
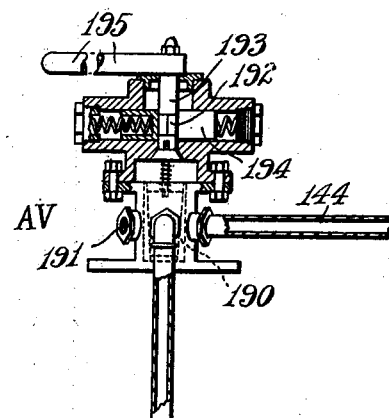
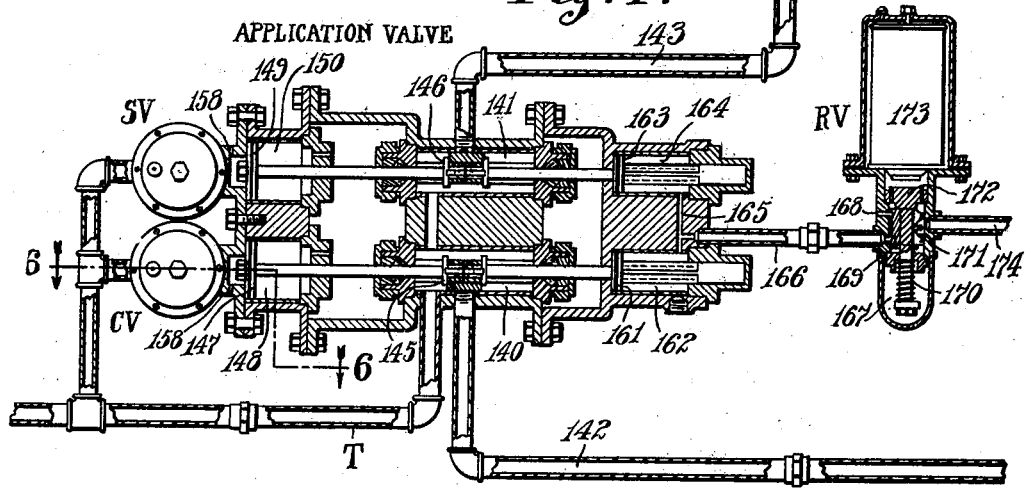
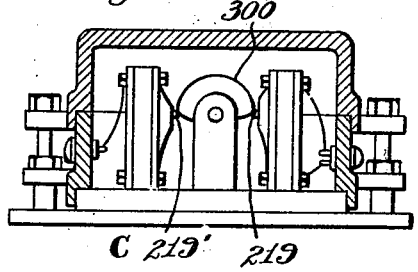
INVENTOR.
John E. Stiegelmeyer,
BY
Hood + Hahn.
ATTORNEYS

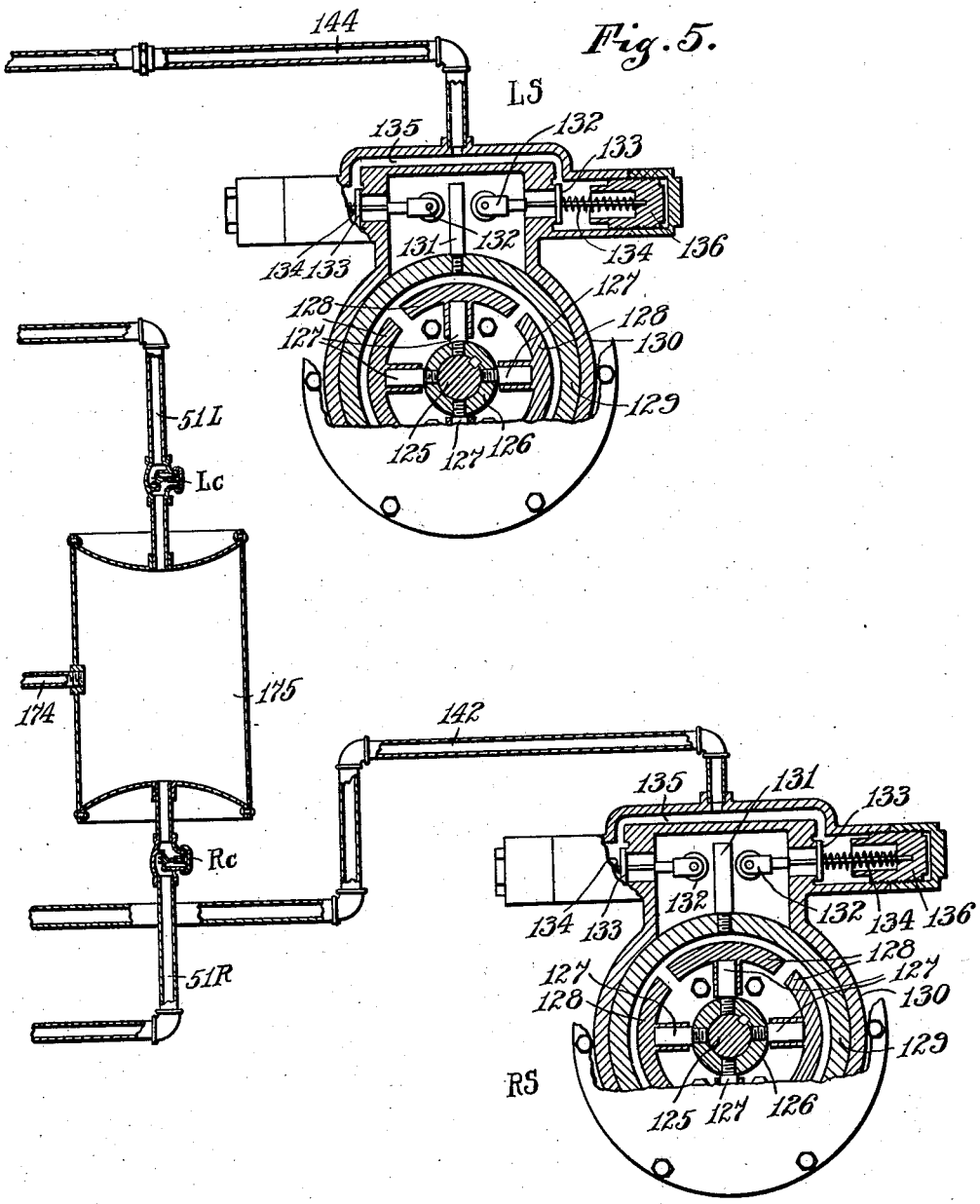

Jan. 20, 1931. J. E. STIEGELMEYER 1,789,663
AUTOMATIC TRAIN CONTROL
Filed Aug. 3, 1926 12 Sheets-Sheet 6
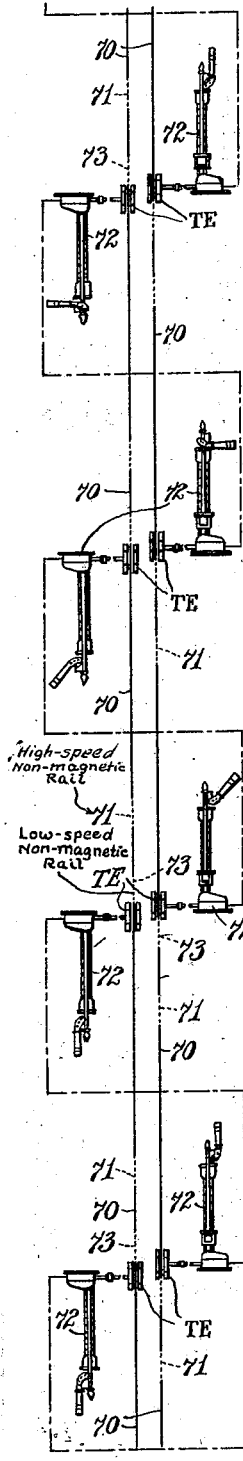
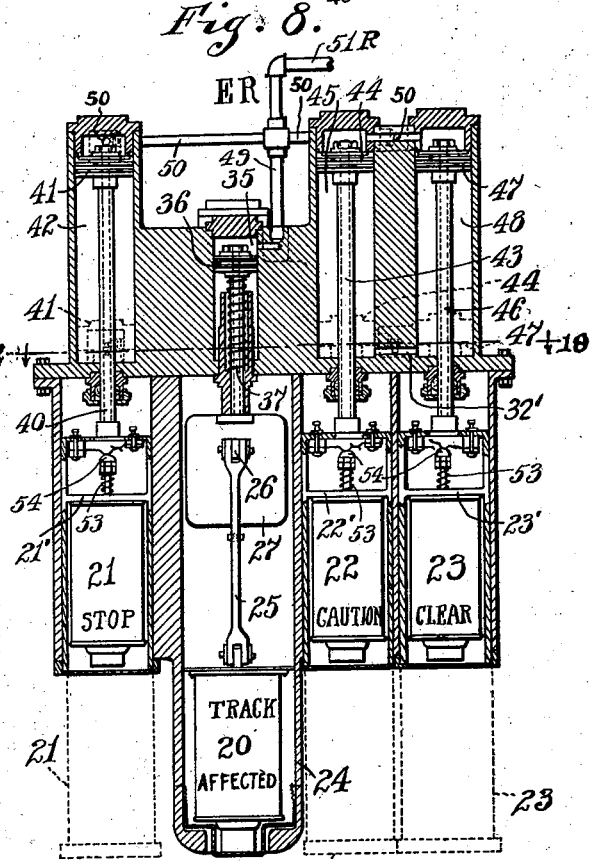
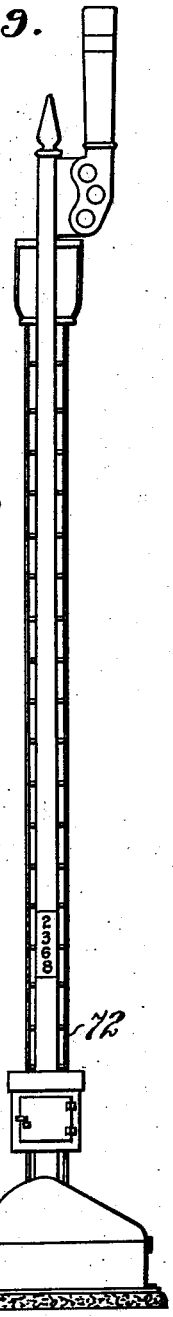
INVENTOR.
John E. Stiegelmeyer,
BY
Hood + Hahn.
ATTORNEYS

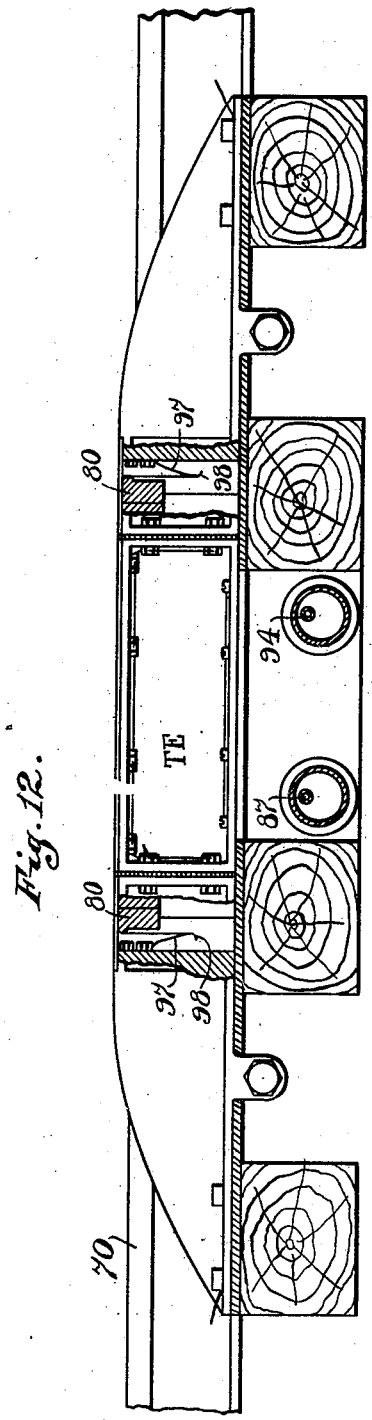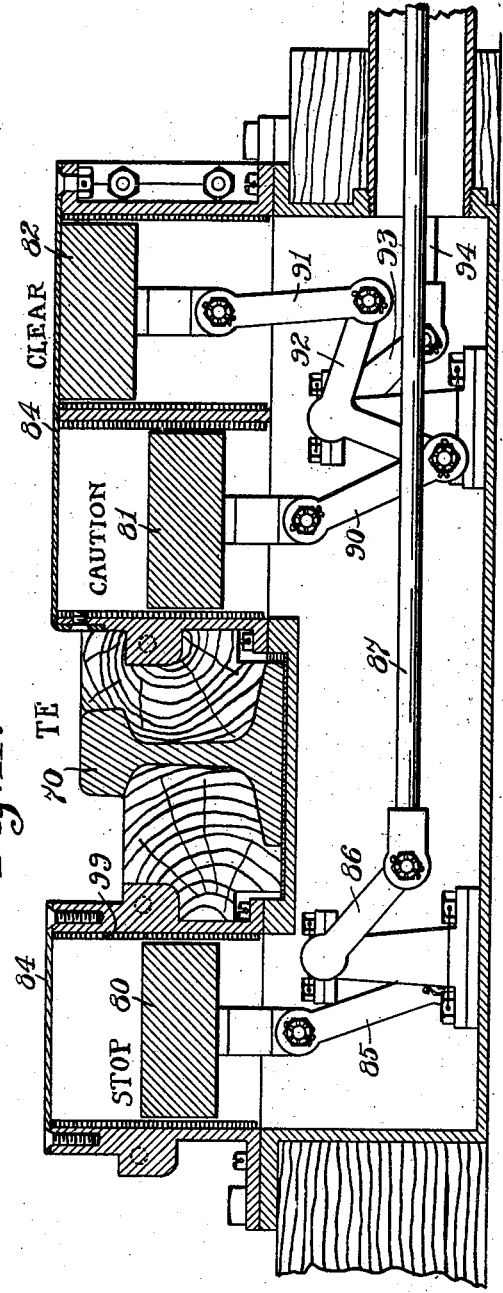

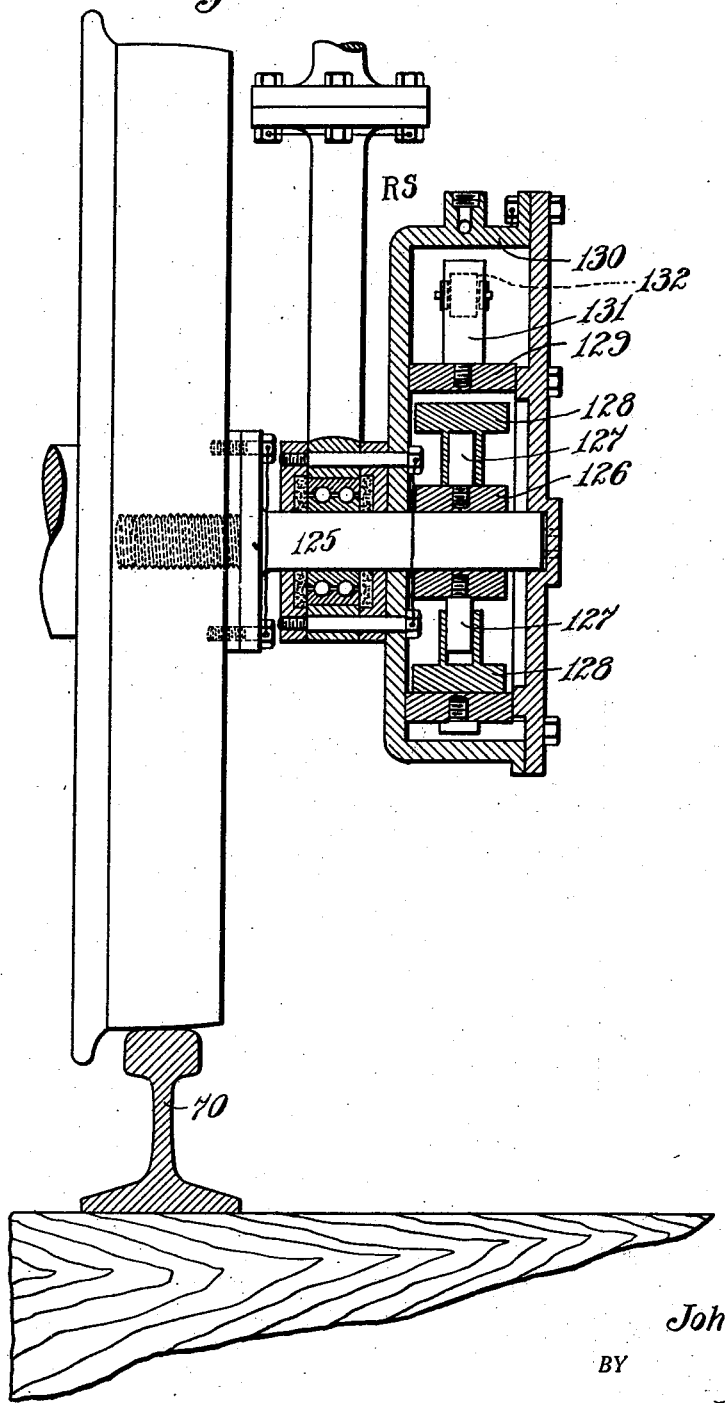

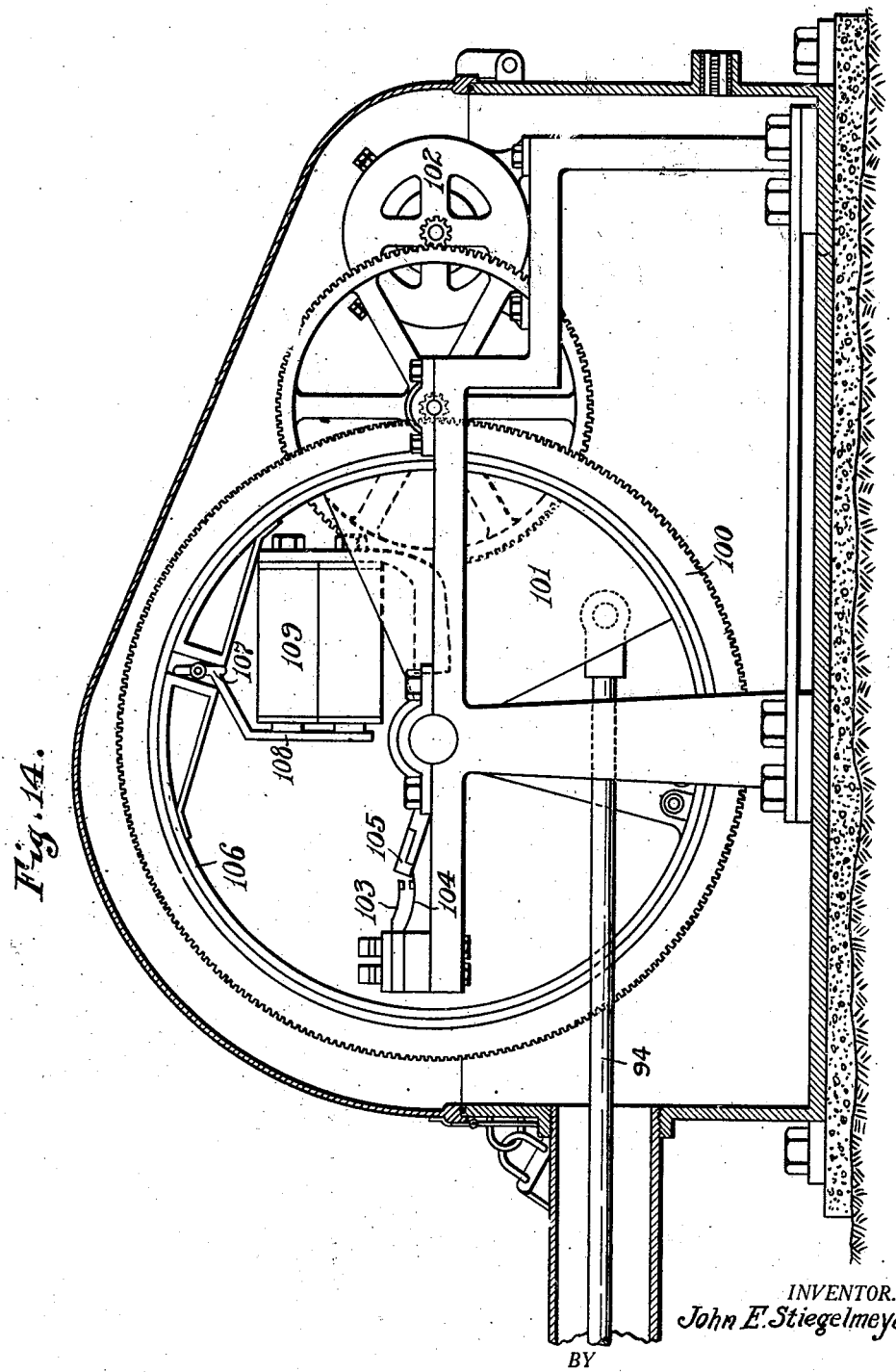

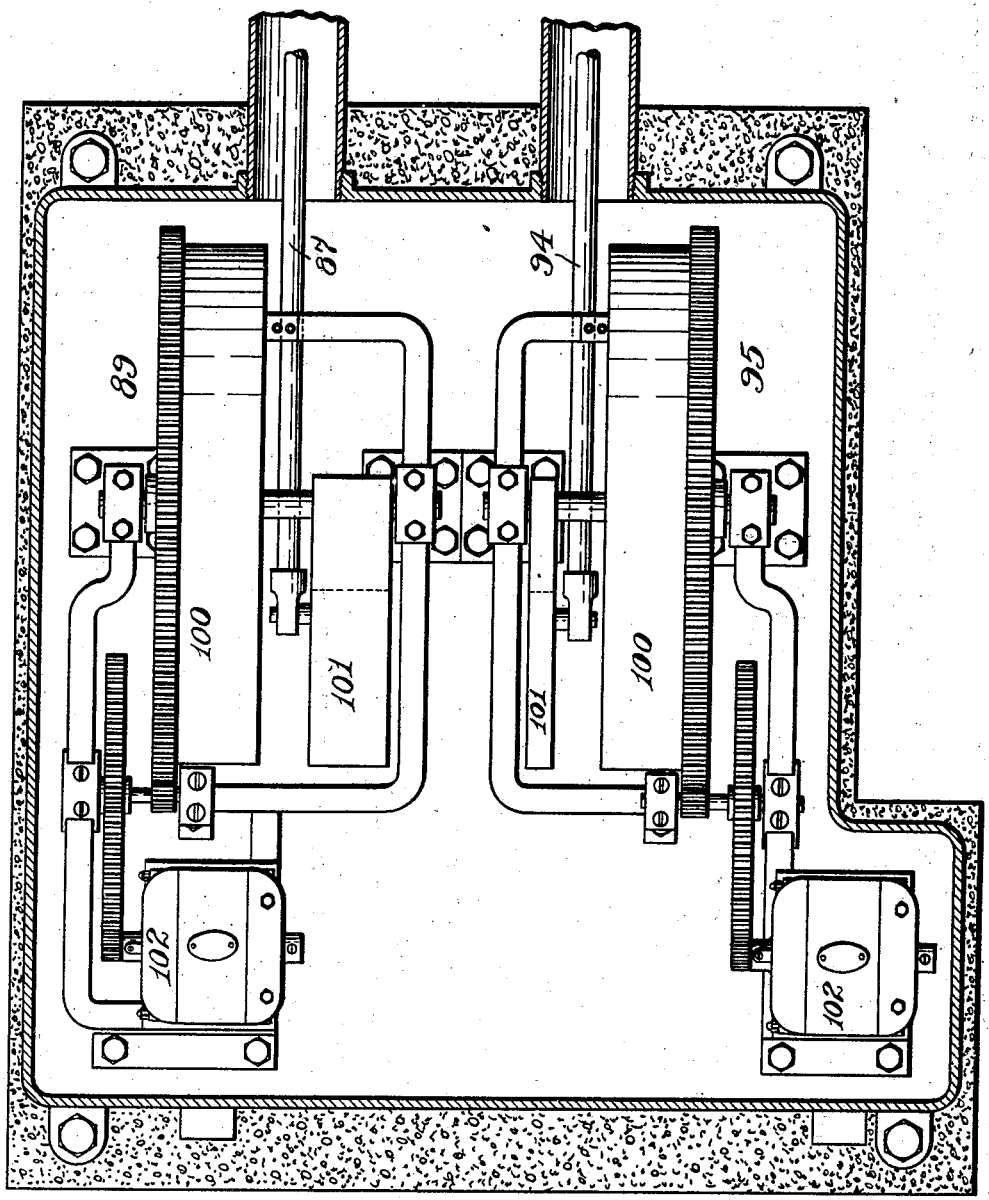

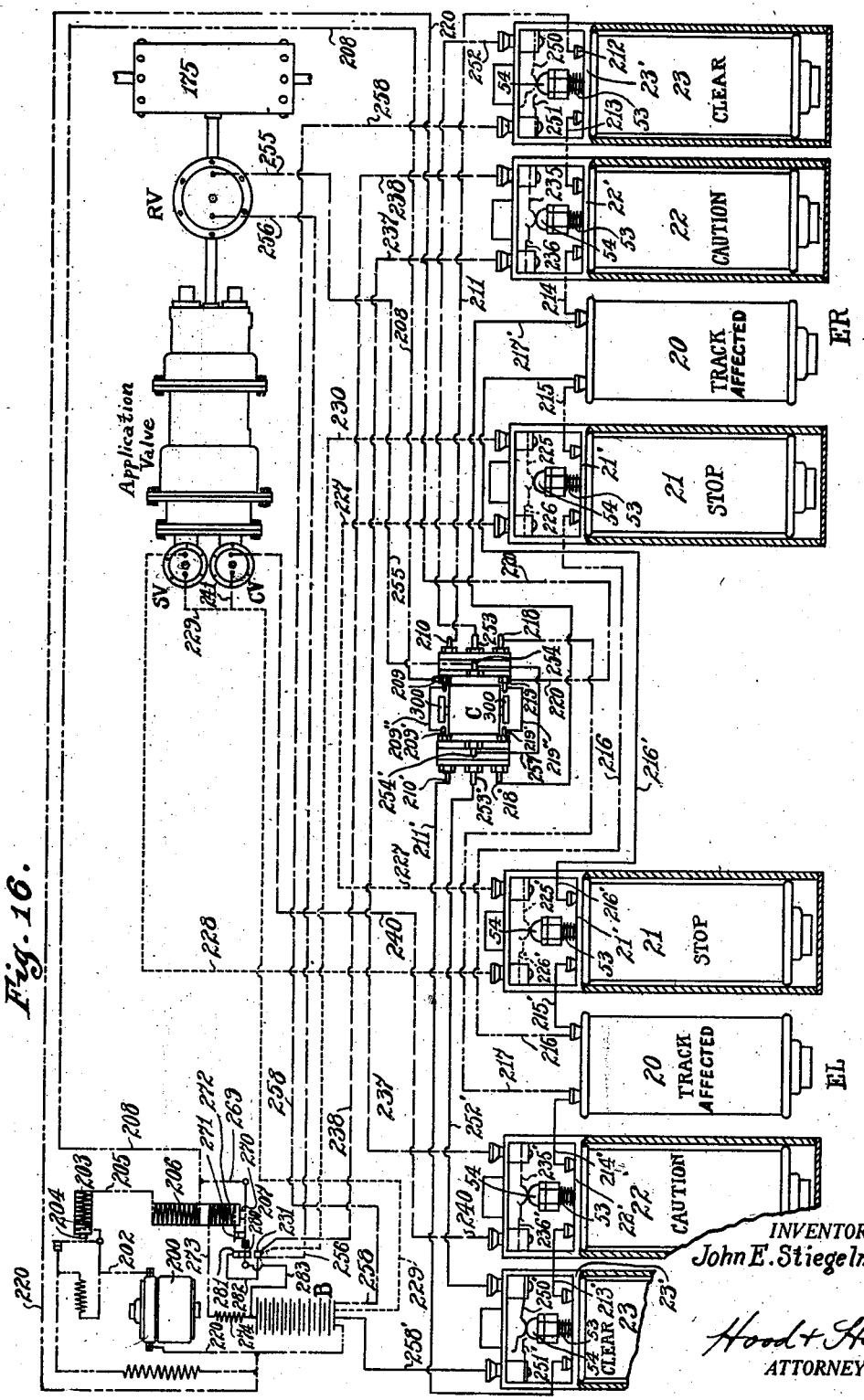
Jan. 20, 1931.    J. E. STIEGELMEYER    1,789,663
AUTOMATIC TRAIN CONTROL
Filed Aug. 3, 1926    12 Sheets-Sheet 11
INVENTOR.
John E. Stiegelmeyer,
Hood + Hahn.
ATTORNEYS

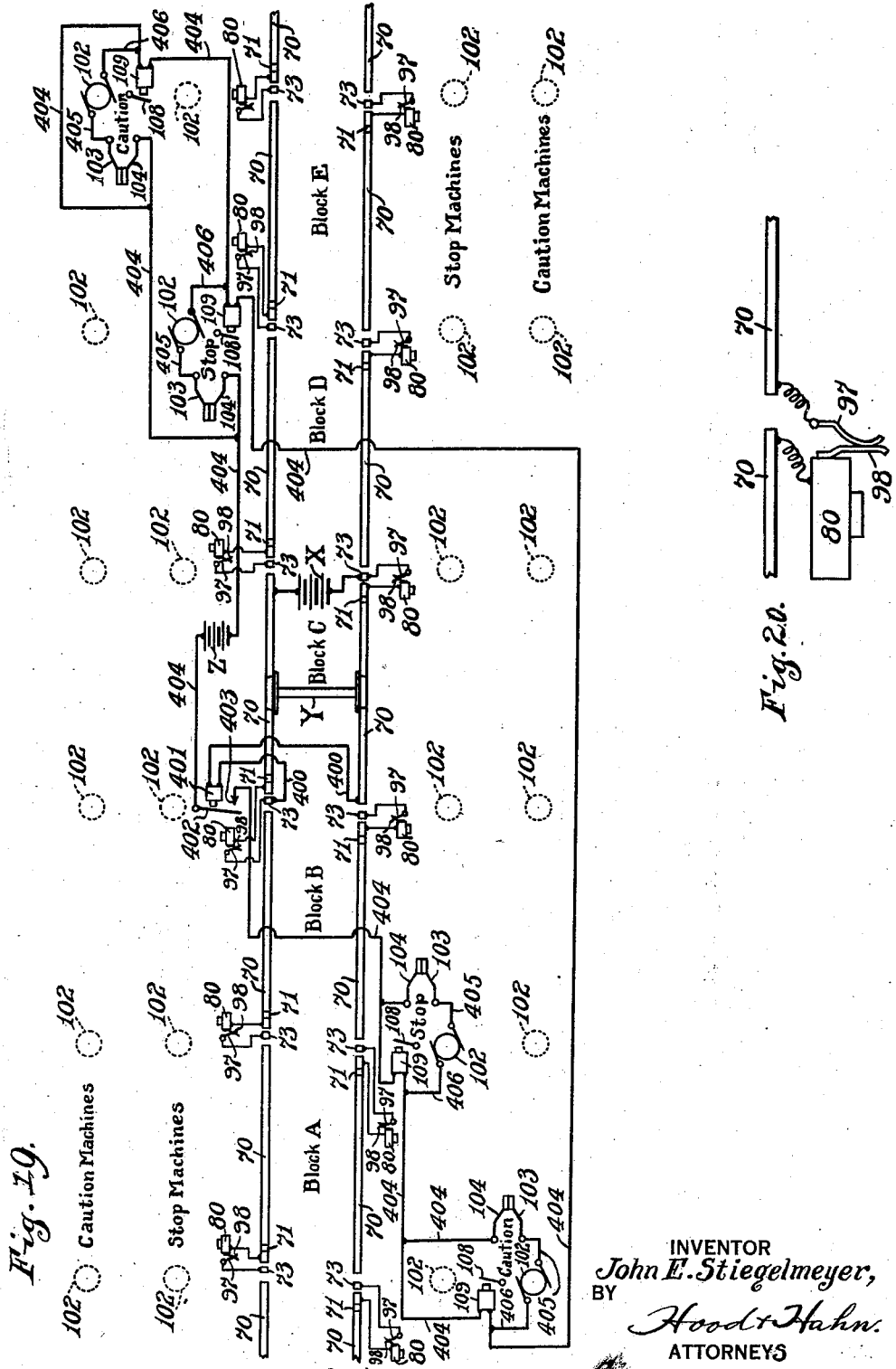

Patented Jan. 20, 1931

1,789,663

UNITED STATES PATENT OFFICE

JOHN E. STIEGELMEYER, OF INDIANAPOLIS, INDIANA

AUTOMATIC TRAIN CONTROL

Application filed August 3, 1926. Serial No. 126,797.

The object of my invention is to provide a mechanism, comprising a series of coordinated units, by means of which the movement of a locomotive or other similar load-drawing unit may be controlled by means of track signal elements beyond the control of the engine driver.

I am aware that devices have heretofore been provided for accomplishing the general object of my present invention, and that some of said devices have gone into use.

So far as I am aware, such prior devices may be grouped into three general classes.

1. A system involving parts upon the engine mechanically operated by contact with adjustable elements adjacent the track.

2. Devices involving the making of electrical contacts between portions carried by the engine and portions arranged adjacent the track.

3. Devices embodying electrical induction elements, some carried by the engine and some arranged adjacent the track but not involving mechanical contact.

The devices carried by the engine cause the movement of the parts which will control the movement of the engine through the medium of the throttle valve or braking devices.

Such devices have been found to be subject to variations in weather conditions, electrical disturbances, vibrations and clearances, and the primary object of my present invention is to produce a system of mechanisms which will not involve any mechanical contacts between elements carried by the engine and elements arranged adjacent the track, and which will not involve production or maintenance of induction electrical currents but which, on the contrary, will be subject to and under the control of magnetic forces, and which will be free from disturbance by mechanical vibrations and which will permit provision of adequate clearances, the arrangement and construction being such that the apparatus will be free from possibility of disturbances by varying weather or external electrical conditions.

The accompanying drawings illustrate my invention.

Figure 3:
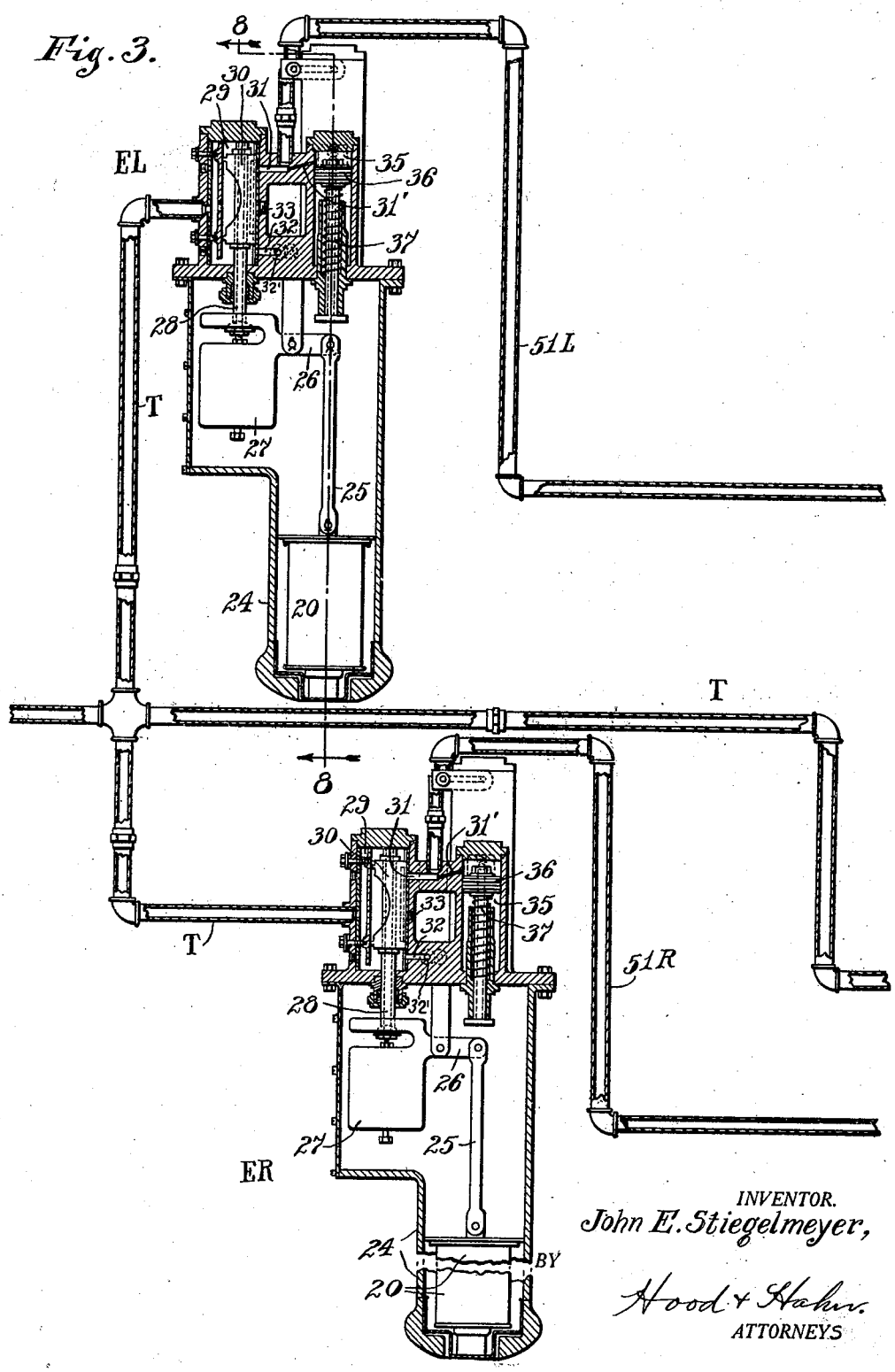

Fig. 3, Fig. 4 and Fig. 5 (to be considered together) a diagrammatic sectional view of the elements of my invention which are carried by the engine;

Fig. 6 a section on line 6—6 of Fig. 4;

Fig. 7 a transverse section of the switch circuit controller;

Fig. 8 a section of one of the magnet shoes carried by the locomotive, said section being on line 8—8 of Fig. 3;

Fig. 9 a transverse section of a locomotive track and an elevation of an adjacent signal tower;

Fig. 10 a diagrammatic illustration of a series of blocks of a single track equipped with portions of my invention;

Fig. 11 a transverse section, on a larger scale, of the track element;

Fig. 12 a side elevation, in partial vertical section, of the construction shown in Fig. 11;

Fig. 13 an axial section of one of the speed governors carried by the engine;

Fig. 14 an elevation, in partial vertical section, of a common form of machine for operating the tower signal;

Fig. 15 a plan in partial horizontal section of the parts shown in Fig. 14;

Fig. 16 a wiring diagram of the parts carried by the engine;

Fig. 17 a fragmentary detail, diagrammatic in character, to indicate the connection between the reversing shaft arm and element 300;

Fig. 18 a fragmentary section on a smaller scale on line 18—18 of Fig. 8; Fig. 19 a wiring diagram showing the connections, with the line wires of a standard signalling system, of the mechanisms for actuating the "stop" and "caution-clear" heads; Fig. 20 a fragmentary wiring diagram showing the manner of connecting the terminals 97 and 98 in series with the track circuit.

*The engine shoes*

At some point on the engine and supported by suitable brackets are two mechanisms which, for convenience, I call engine shoes, so mounted as to be one over each rail.

One of these shoes is at the right hand side of the engine and the other at the left hand and are designated in the drawings as ER and EL, most conveniently mounted just in front of the front wheels. Each of these shoes is illustrated, in vertical section, in Fig. 8, and comprises a track-affected magnet 20, a "stop" magnet 21, a "caution" magnet 22, and a "clear" magnet 23. Each of these elements is most conveniently an electro-magnet, the coil of which is connected, through suitable circuits which will be described, with a source of power so that the cores thereof will be continuously magnetized.

Magnet 20 lies within a shell 24 so as to be protected from the weather, the lower end of said shell lying close to the surface of one of the track rails. Magnet 20 is supported by a link 25 from one arm of a lever 26, (Fig. 3) the other arm of which is provided with a counterweight 27, said other arm engaging a valve rod 28 projected into a pressure chamber 29 and carrying a valve 30 controlling pressure ports 31 and 32 and an exhaust port 33 which leads to atmosphere. Leading into pressure chamber 29 is one branch of a train line pipe T which is connected to the train line of the standard air brake system.

Arranged alongside pressure chamber 29 is a reset cylinder 35 communicating with chamber 29 through the restricted passage 31' connecting with port 31. Within cylinder 35 is a reset piston 36 normally urged upwardly by spring 37 to a position where its lower end is free from, but aligned above, link 25. Cylinder 35, by reason of its connection with chamber 29 through restricted passage 31' and passage 31 exhausts through 33 when valve 30 shifts to connect 31 with 33. This is the normal running position of valve 30.

The "stop" magnet 21 is carried by a frame 21', carried by a piston rod 40 provided with a piston 41 in a cylinder 42.

Similarly, "caution" magnet 22 is carried by a frame 22', carried by a piston rod 43 provided with a piston 44 in a cylinder 45, and the "clear" magnet 23 is carried by a frame 23', carried by a piston rod 46 provided with a piston 47 in cylinder 48. The cylinders 42, 45 and 48 at their lower ends are in communication with port 32 (Figs. 3 and 18) and the upper ends of said cylinders 42, 45 and 48 are in communication with port 31 through the medium of pipes 49 and 50, pipe 50 being connected to a pipe 51, 51L on the left side of the engine, and 51R on the right side of the engine the purpose of which will appear.

Each of the "stop", "caution" and "clear" magnets is yieldingly supported in its frame by a spring 53 which normally holds the magnet in its upper position in the frame, provision being made for very slight possible vertical movement of each magnet in its frame under magnetic forces, for a purpose which will appear. Springs 53 are sufficiently stiff to support the magnets against jarring vibration.

Each of these "stop", "caution" and "clear" magnets carries a finger 54 which engages a spring terminal which will be described later.

The construction of the two engine shoes is identical and therefore similar parts are similarly designated in both of these units ER and EL in Fig. 16.

It will be made to appear later that when one of these units is in active condition the other is inactive, depending upon the direction of motion of the engine.

The track upon which the engine is to move and upon which its movement is to be controlled is composed in general of ordinary rail sections 70 of magnetic material. At signal intervals in this track I place non-magnetic sections 71, i. e., a material which is not affected by magnetic fluxes, such material for instance as manganese steel.

There will be one of these non-magnetic sections 71 at a considerable distance from, and on the approach side of, each signal semaphore or other signalling apparatus 72 (say about fifteen rail lengths) and this non-magnetic section 71 I will designate for convenience as the "high speed rail". There will also be immediately on the approach side of each signal station, between the "high speed rail" and said station, a second non-magnetic rail section 73 which I will call the "low speed rail", the arrangement being such that, so long as the track-affected magnet 20 is energized and it lies over a main track portion 70, it will be magnetically held in its lowest position, but whenever this track-affected magnet passes over a non-magnetic track section, 71 or 73, the magnetic relation between the track-affected magnet 20 and the track will be broken and counterweight 27 may serve to draw the magnet 20 away from the track and out of magnetic relation, at the same time shifting valve 30 for a purpose which will be made to appear.

*The track element*

At each signal station I provide the track element TE (Figs. 11, 12) which comprises a vertically movable "stop" head 80, a vertically movable "caution" head 81 and a vertically movable "clear" head 82. These heads 80, 81 and 82 are of substantial size, extending two or three feet lengthwise of the track, and of magnetic material, each encased in a weather-proof casing 84 of non-magnetic material, the arrangement being such that said heads and their operating mechanisms will be thoroughly protected from weather conditions.

Head 80 is vertically movable to and from magnetically-active position by means of link 85, lever 86 and link 87 connected to the wheel 100 of an operating machine 89 which will be described later.

Heads 81 and 82 are connected by links 90 and 91 respectively with a bell crank lever 92 carried by a rock shaft having an operating arm 93 connected by a link 94 with an operating machine 95, the arrangement being such that when one of these latter magnetic heads is in magnetically active position the other is out of magnetically active position, as will be made to appear.

In order to make sure that any breakage of the support for head 80 will give a proper indication to track supervisors, said head is placed in series in the track circuit of the adjacent block. This is accomplished, as indicated in Figs. 12 and 19, by providing spring terminals 97 and spring contacts 98 carried by head 80, said head being insulated by insulation 99 from the enclosing casing and the arrangement being such that any breakage of the support of the head 80 which would permit it to become inoperative would permit a breakage of the track block circuit at the contacts 97—98.

The operating machines

Any suitable means may be used for shifting the heads 80 and 81—82.

In the present instance I have shown a well-known form of operating machine comprising a rotatable drum 100 geared by a gear reduction train to a motor 102. Concentric with drum 100 is a counter-weighted element 101 which carries a clutch 106 biased to non-clutching position and movable to clutching position by cam 107 carried by armature 108 of electro-magnet 109 which is carried by the counter-weighted element 101. The element 101 also carries an insulated finger 105 adapted, when the counter-weight is in its upper position to move terminal 104 away from terminal 103, so as to break the energizing circuit of motor 102, as will be hereinafter more fully explained.

There are two of these machines for each track element, rod 87 of the stop head 80 being connected to the counter-weighted element of one machine, and rod 94 to the "caution-clear" track element being connected to the counter-weighted element of the other machine as shown in Fig. 15.

The operation of these machines is as follows:

The counter-weight 101 being in its low gravity position, to raise "stop" element 80 or "caution" element 81 to the upper position, terminal 104 will be in contact with terminal 103. Magnet 109 and motor 102 are in parallel in their energizing circuits controlled by a single track relay, as will be hereinafter pointed out, so that, magnet 109 being energized to cause cam 107 to force clutch 106 into frictional contact with drum 100, motor 102 will also be energized and will raise the counter-weighted element to its upper position where finger 105 separates terminal 104 from terminal 103 so as to break the motor circuit, the clutch 106 being retained in engagement with drum 100 so long as magnet 109 continues to be energized.

Whenever a signal is received at any signalling station the appropriate electro-magnet 109 will be de-energized, thus releasing the appropriate clutch 106 and permitting the appropriate counter-weight 101 to raise the connected magnetic head of the associated track element to magnetically-active position.

Restricted speed governors

Under certain abnormal conditions it is desirable that the train be permitted to proceed, under ordinary running control by the engineer, but at a restricted speed. Under other abnormal conditions it is desirable that an automatic stop application of the brakes be provided but that the engineer be permitted, by reason of a special and continuous act, to proceed but at a much lower rate of speed.

I have therefore incorporated in my apparatus two automatic governing mechanisms, one of which I shall call, for convenience, the "restricted speed" governor RS and the other of which I shall call the "low speed" governor LS. The precise mechanical construction of these governors may be varied within a wide range. The fundamental characteristic of each must be that, whenever the engine reaches a predetermined speed and this particular governor is in action, it shall serve to apply the ordinary air brakes and thus prevent procedure under a greater speed.

In the present drawings I have shown a particular form of governing mechanism which readily governs movement of the locomotive in either direction and at any desired speed and is readily adjustable for different speeds. The mechanical construction of each of these governors is identical and comprises the following:

Secured to a projected end of one of the truck shafts 125 is a collar 126 provided with a plurality of radially projected fingers 127, upon each of which is mounted, for free radial movement, a friction shoe 128 which, under rotation of the axle, will be thrown radially outwardly against a friction ring 129 which is rotatably mounted in casing 130. Ring 129 is provided at one point with a radial finger 131 which lies between two valve stems 132, 132, each of said valve stems carrying a valve 133 normally seated by a spring 134 to close communication with atmosphere from a chamber 135 connected to train line T. The compression of springs 134 may be adjusted by an adjustable abutment 136 so as to thus determine the amount of resistance which must be overcome by finger 131 in order to open either one of the valves 133.

Application valve

The application valve comprises a "caution" valve chamber 140 and a "stop" valve chamber 141, these chambers being in connection with each other and with the train line pipe T. Leading from chamber 140 is a pipe 142 which leads to the chamber 135 of the restricted speed governor RS. Leading from chamber 141 is a pipe 143 which communicates, through the alert valve AV and pipe 144 with chamber 135 of the low speed governor LS.

In the valve chamber 140 is a valve 145 which controls communication between chamber 140 and pipe 142. Similarly a valve 146 in chamber 141 controls communication between that chamber and pipe 143. Valve 145 is opened by means of a piston 147 in a cylinder 148 and valve 146 is opened by means of a piston 149 in a cylinder 150.

Flow of train line air pressure to and from one end of cylinder 148, in order to actuate piston 147 in one direction, is controlled by a "caution" valve CV, and a "stop" valve SV of the same construction controls flow of train line air pressure to and from one end of cylinder 150 to actuate piston 149 in one direction.

The construction of valves CV and SV is illustrated in Fig. 6. The solenoids of these valves are so wound and constructed, in a well-known manner, that even a momentary break in the current permits their valves to immediately drop. Train line air pressure enters a chamber 155 and is normally blocked by a valve 156 which is normally held up to its seat against the action of gravity and against the train line air pressure by an electro-magnet 157. Whenever the circuit of the magnet 157 is broken, valve 156 drops away from its seat to admit train line pressure to the adjacent cylinder 148 or 150. Valve 156 is restored to its normally closed position by a re-energization of magnet 157 and the train line pressure which has been admitted past the valve gradually equalizes to atmosphere through an appropriate bleed opening 158.

Valve 145 is returned to its normal running position where it closes connection between chamber 140 and pipe 142 by means of a piston 161 in cylinder 162, and valve 146 is similarly returned to normal running position, where it closes communication between chamber 141 and pipe 143, by a piston 163 in cylinder 164. Cylinders 162 and 164 communicate with each other through passage 165 and this passage communicates through pipe 166 with the release valve RV.

The release valve

The release valve RV comprises a valve chamber 167 which communicates with pipe 166 and communicates with atmosphere through port 168. Mounted in chamber 167 is a slide valve 169 which normally connects pipe 166 with atmosphere through port 168, the valve being normally held in this position by means of a spring 170. The valve is held to its seat in the usual manner by a spring 171.

The operating stem of valve 169 is provided with a head 172 of magnetic material which lies within the field of the pole of an electromagnet 173, the energizing circuit of which will be later described.

Leading from chamber 167 is a pipe 174 which communicates with the release valve reservoir 175. Pipes 51L and 51R, leading respectively from engine shoes EL and ER enter the release valve reservoir 175, said pipes being provided with check valves Rc and Lc between the reservoir and the engine shoes and opening towards the reservoir so that there may be a flow of air from the engine shoe valve cavities 29 into the release valve reservoir at appropriate times.

The alert valve

In order that the engineer may release the brakes, following, or in conjunction with, an automatic brake application, and proceed at low speed, without necessarily coming to a dead stop, I have provided the alert valve AV which has already been mentioned. This valve comprises a three-way cock 190 which may lie in position either to form a connection between pipes 143 and 144 or in position to form a communication between pipe 143 and atmosphere through port 191. This cock 190 is normally biased to a position which establishes communication of pipe 143 to atmosphere by means of a cam 192 on valve stem 193, said cam being acted upon by spring plungers 194. Valve stem 193 is projected out of the casing of valve AV and provided with a hand lever 195 which may be easily manipulated by the engineer, but the construction is such that the moment the engineer lets go of this lever the plug valve 190 will resume its normal position where it establishes communication between pipe 143 and atmosphere through port 191.

The circuits

Figure 1:
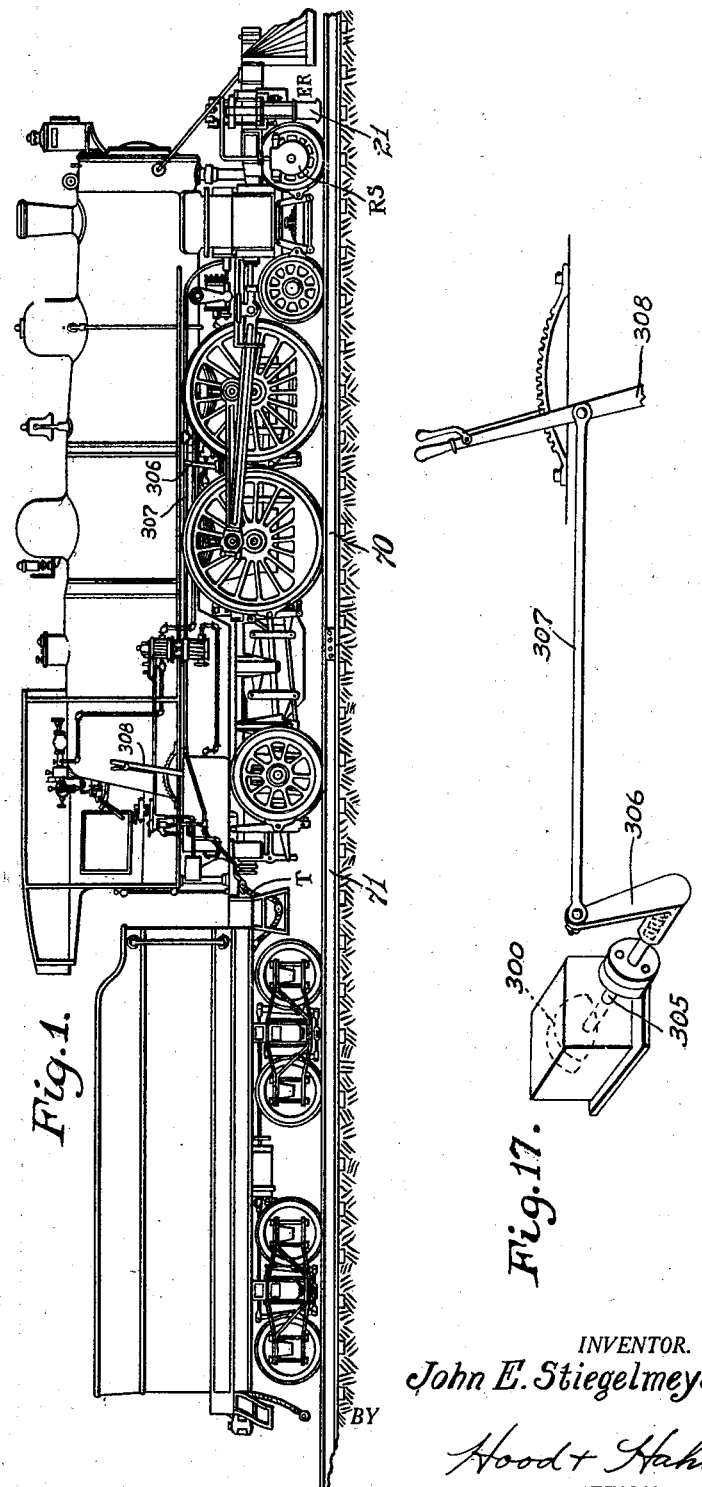
Fig. 1 is a side elevation, in partial vertical section of an engine equipped with my improvements.
Figure 2:
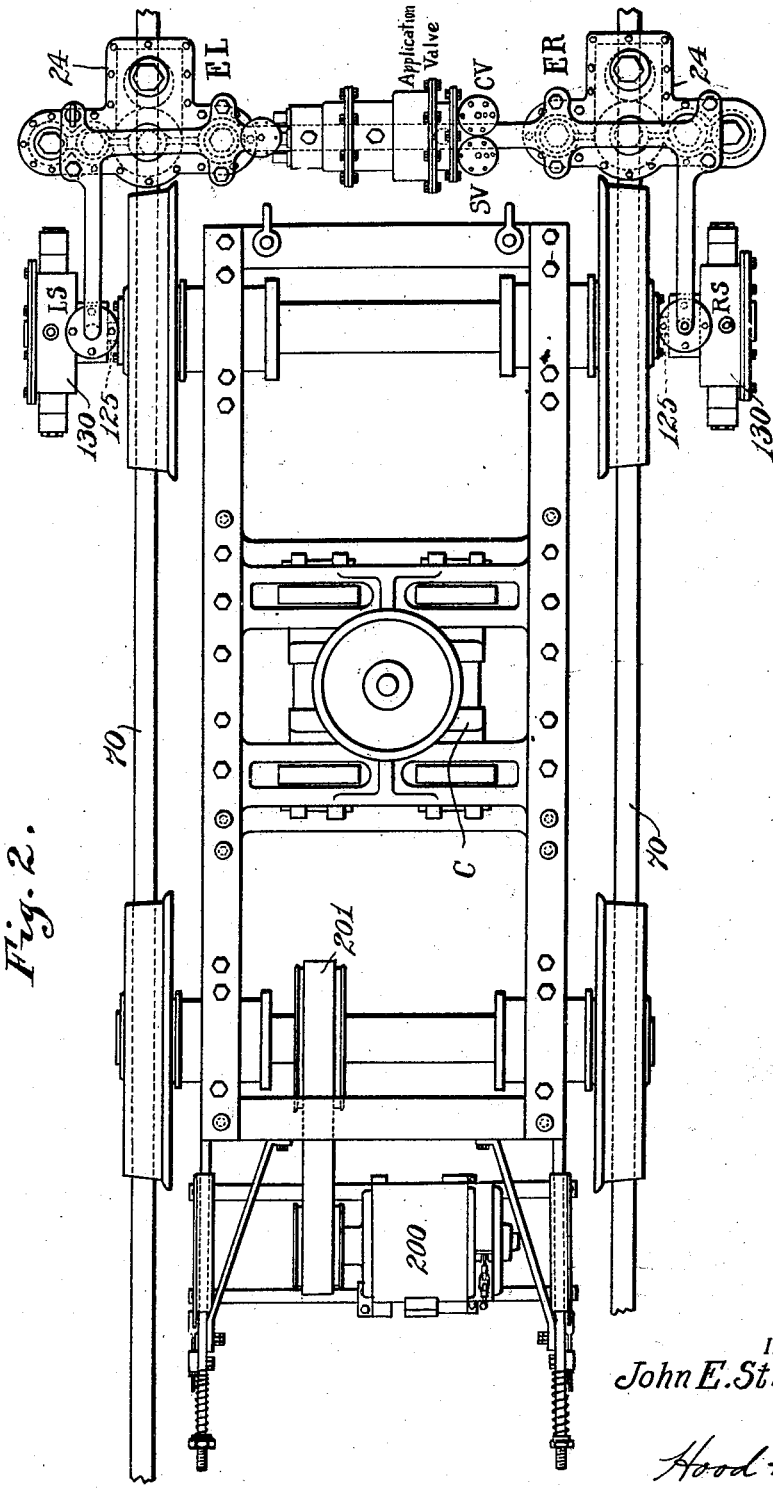
Fig. 2 is a plan of the front truck of an engine provided with said improvements.

On the engine is a direct current generator 200 of sufficient capacity to energize the several electro-magnets. This generator is driven from one of the axles of the locomotive by belt 201 (Fig. 2). Leading from the positive side of generator 200 is a wire 202 connected to the coil 203 of a current regulator relay 204, passing thence by wire 205 to a coil 206 forming part of an automatic cut-out relay 207, thence by wire 208 to terminal 209 of the circuit controller C. Cooperating with terminal 209 is a terminal 210 to which wire 211 is connected, said wire being connected at 212 with one end of the coil of the "clear" magnet 23 of the right hand engine shoe ER, thence by wire 213 to the coil of the "caution" magnet 22 of ER; thence by wire 214 to the coil of the track-affected magnet 20 of ER; thence by wire 215 to the coil of the "stop" magnet 21 of ER; thence by wire 216 to the coil of the track-affected magnet 20 of the left engine shoe EL; thence by wire 217 to terminal 218 of controller C. Cooperating with said terminal 218 is a terminal 219 which is connected by wire 220 with the negative side of the generator.

This system of wiring is distinguished in Fig. 16 by dash-two-dot lines. Corresponding respectively with terminals 209, 210, 218 and 219 of controller C are terminals 209', 210', 218' and 219'. Terminals 219 and 219' are electrically connected by wire 219'' and terminals 209 and 209' are electrically connected by wire 209''.

Leading from terminal 210' is a wire 211' which connects with one end of the coil of the "clear" magnet 23 of the left hand engine shoe EL, thence by wire 213' to the coil of the left hand "caution" magnet 22, thence by wire 214' to the coil of the left hand track-affected magnet 20, thence by wire 215' to the coil of the left hand "stop" magnet 21, thence by wire 216' to the coil of the right hand track-affected magnet 20, thence by wire 217' to terminal 218'.

This circuit system is identified by solid lines. Arranged adjacent the pin 54 of the right hand "stop" magnet 21 is a spring terminal 225 and in position to be engaged by pin 54 of the left-hand "stop" magnet 21 is a spring terminal 225'. Cooperating with terminal 225 is a terminal 226. Terminals 226 and 225' are connected by wire 227. Terminal 226' is connected by wire 228 to one end of the coil of the magnet of "stop" valve SV and the other end of said coil is connected by wire 229 with a low voltage storage battery B. A wire 230 connects terminal 225 with a terminal 231 which forms part of the automatic cut-out 207.

This circuit may be known as the "stop" circuit and is identified in Fig. 16 by a dotted line, as follows: B, 283, 280, 231, 230, 225, 226, 227, 225', 226', 228, SV, 229, B; or when the generator 200 is active (see generator circuit description which follows) as follows:
200, 202, 203, 205, 206, 269, 270, 271, coil of 272, 273, 274, 283, 280, 281, 282, 231, 230, 225, 226, 227, 225', 226', 228, SV, 229, 220, 200.

Opposite pin 54 of the right-hand "caution" magnet 22 is a spring terminal 235 and opposite the pin 54 of the left hand "caution" magnet is a spring terminal 235'. Cooperating with terminal 235 is a terminal 236 and cooperating with terminal 235' is a terminal 236'. Terminal 236 is connected by wire 237 with terminal 235'. Wire 238 connects terminal 235 with the terminal 231 of the automatic cut-out 207. Wire 240 connects terminal 236' with one end of the coil of the magnet of the "caution" valve CV, the other end of said coil being connected by wire 241 with wire 229 and leading thence to battery B.

This circuit may be known as the "caution" circuit and is identified by dash lines, as follows: B, 283, 280, 231, 238, 235, 236, 237, 235', 236', 240, CV, 241, 229, B, or, when the generator is active (see generator circuit description which follows), as follows:
200, 202, 203, 205, 206, 269, 270, 271, coil of 272, 273, 274, 283, 280, 281, 282, 231, 238, 235, 236, 237, 235', 236', 240, CV, 241, 229, 220, 200.

Arranged in position to be engaged by pin 54 of the right hand "clear" magnet 23 is a spring terminal 250, and cooperating with pin 54 of the left hand "clear" magnet 23 is a spring terminal 250'. Terminal 250 cooperates with a terminal 251 and terminal 250' cooperates with a terminal 251'. Terminal 250 is connected by wire 252 with a terminal 253 of controller C and cooperating with this terminal is a terminal 254 which is connected by wire 255 with one end of the coil of the magnet of the release valve RV, the other end of said coil being connected by wire 256 with terminal 231. Terminal 250' is connected by the wire 252' with a terminal 253' of controller C, said terminal cooperating with a terminal 254' which is electrically connected with terminal 254 by a wire 257. Terminal 251 is connected by a wire 258 with battery B and terminal 251' is connected by wire 258' with battery B.

This circuit may be known as the "clear" circuit and for convenience I have identified the part relating to the right hand engine shoe magnet by a dash-dot line and the part relating to the left hand engine shoe magnet by a solid line, for the purpose of indicating that when one circuit is in control the other is not in control. The "clear" circuit through the right hand engine shoe "clear" magnet is:
B, 283, 280, 231, 256, RV, 255, 254, 253, 252, 250, 251, 258; and the "clear" circuit through the left hand engine shoe "clear" magnet is:
B, 283, 280, 231, 256, RV, 255, 254, 257, 254', 253', 250', 251', 258', B.

Each of these circuits may be supplied from the generator 200, when 280 is in contact with 281 as outlined above.

The positive side of generator 200 is connected through 269, armature 270, contact 271 and coil 272 of relay 207 with a wire 273 which leads, through resistance 274 to the positive side of battery B.

Coil 206 is so proportioned as not to afford sufficient energy to relay 207 to pick up armature 270, and thus make contact with terminal 271 unless a predetermined speed is attained by the generator.

Carried by armature 270, but insulated therefrom is a contact 280 which, in the lower position of armature 270 contact with terminal 231 and in the upper position contacts with a terminal 281 which is electrically connected to terminal 231 by a wire 282. The contact 280 is connected by wire 283 with the positive side of the battery B between said battery and the resistance 274, the arrangement being such that whenever the speed of generator 200 is more than the speed permitted by the slow speed governor LS the armature 270 will be in its upper position and current generated by the generator but at the low voltage resulting from resistance 274, will be delivered to wires 258, 256 and 238, and whenever the generator speed is below the amount stated, contact 280 will be in contact with terminal 231 and the battery B will supply current to wires 258, 256 and 238. When the engine is at rest armature 270 is in its lower position and does not contact with 271. When the engine starts up and starts generator 200, coil 206 is energized and armature 270 is, therefore, picked up into the position shown in Fig. 16 whereupon current from coil 206 may flow through 269, 270 and 271 to coil 272 and thence through resistance 274 where it becomes available to charge battery B and also to flow through terminals 280 and 281 and wire 282 to terminal 231 from whence it is distributed through the various wires leading therefrom. The wiring in the extreme upper left hand corner of Fig. 16 is an ordinary standard wiring for a generator storage battery set so as to insure charging of the battery when sufficient speeds are obtained, the unlettered wiring in the extreme upper left hand corner between 204 and 220 and generally referred to as relay 204, being the standard wiring for causing generator 200, no matter what its extreme speed may be, to provide a uniform voltage current. This particular detail forms no part of my present invention and is merely a standard mechanism for floating the battery B on the circuit. The arrangement is also such that the movement of terminal 280 from terminal 281 to terminal 231 causes a temporary break in the circuits of the coils of the "stop" valve SV and the "caution" valve circuit CV so that there will be an application of the brakes unless the engineer is alert and properly manipulates the alert valve AV.

The operating machines are wired into the block signalling system in the usual manner of connection for operating machines of the ordinary semaphore arms and this system of wiring is illustrated in Fig. 19. Fig. 19 illustrates five blocks of track, A, B, C, D and E respectively, but shows only the operating machines which are affected by the track relay of block C because if an attempt were made to include in this figure on so small a scale, all of the operating machines and track relays of all of the blocks, the figure would be a mess of indistinguishable circuit lines. It is thought however, that this figure is a clear disclosure of the arrangement.

The two rails of each block at one end are connected to the opposite sides of the track-battery X and the opposite ends of these rails are connected by wires 400 with the coil 401 of the track relay which, when energized, holds terminal 402 in contact with terminal 403. Assuming the track in Fig. 19 to be an east and west track, the track relay of block C will control the "stop" machine at the east end of block D, the "caution" machine at the east end of block E, the "stop" machine at the west end of block B, and the "caution" machine at the west end of block A and therefore terminal 402 is connected by wire 404 with terminals 104 of each of said machines and the coils of magnets 109 of said four machines are in series in said line 404 which is brought back to terminal 403, a battery Z being placed in this line at any desired point. Terminal 103 of each operating machine is connected by wire 405 with one side of the motor 102 of that machine and the other side of said motor is connected by wire 406 with wire 404 so that the motor is in parallel with the adjacent magnet 109.

The circuit 404 is, therefore, a normally closed circuit when the controlling block C is unoccupied. Terminal 402 is held in contact with terminal 403 and each of the connected motors 102 has served, as previously described, to rotate its counter-weighted element to elevated position where the associated terminal 104 has been separated from terminal 103 so as to disconnect the adjacent motor 102 but without de-energizing the adjacent magnet 109. Under these conditions each "stop" head is in its lowest position and each "clear" head is in its upper position. When the first truck Y of a train enters block C it short-circuits the coil 401 of this block so as to release terminal 402, thereby breaking the energizing circuit of the connected electro-magnets 109. Consequently the counter-weighted elements of the stop machines of the track elements at the east end of block D and the west end of block B and of the "caution-clear" machines at the east end of block E and the west end of block A are released, thereby moving the "stop" heads of the track elements at the east end of block D and the west end of block B and the "caution" heads of the track elements at the east end of block E and the west end of block A to their upper positions.

It should be understood from the above description that all of the operating machines of the track elements are connected in groups of the character illustrated in Fig. 19. It should also be understood from the above that with a double track system the grouping will be modified in a manner well-known to signal engineers.

Referring again to Fig. 19 I have indicated diagrammatically how the "stop" head 80 of each block is connected with one of the rails, as indicated on a large scale in Fig. 20. The rail 70 (which includes 71 and 73) is provided with an electrical gap to one end of which is connected terminal 97 and to the other end of which is connected the "stop" head 80.

The parts in the various drawings are shown in forward running positions at a speed in excess of the speed determined by the restricted speed governor RS.

When the engine is at rest from any cause the brakes of the brake system are applied (unless the alert valve is properly held) due to the fact that the train line pressure is being exhausted to atmosphere through the alert valve port 191. This is due to the fact that whenever the engine speed drops below a point where generator 200 can produce enough current to energize coil 206 and lift armature 270, there is a drop of armature 270 and a momentary break of the circuit at 280—281, thus permitting actuation of the stop valve and caution valve which thus places the air brake system under the control of the alert valve. When the engine is brought to a stop the track-affected magnets 20 have been deenergized and their counter-weights have shifted the valves 30 so as to admit air into the upper ends of the cylinders 42, 45 and 48 and all of the magnets of the engine shoes have descended to their lowest positions. At the same time, however, air has been admitted to the upper ends of reset cylinders 35 through their restricted ports and pistons 36 have moved downwardly so as to mechanically restore track-affected magnets 20 to their lowest positions, consequently restoring the valves 30 to the position shown in Fig. 3 so that train line pressure has been readmitted to the lower ends of cylinders 42, 45 and 48 and the "stop" magnets, "caution" magnets and "clear" magnets are restored to their upper or normal running positions, i. e. the positions which they normally occupy or tend to occupy when their companion track-affected magnet is running over magnetic portions of the track. In order to start the engine, the engineer must first shift the alert valve so as to close port 191 and open communication between pipes 143 and 144 and thus put the low speed governor LS in commission. While maintaining his hand upon the alert valve lever 195 he throws his engineer's brake valve to full release position and then to running position. Still holding the alert valve lever 195, he opens his throttle and he must maintain control of the alert valve lever 195 until his engine attains a speed in the neighborhood of the speed determined by the low speed governor, at which time generator 200 has reached sufficient speed to produce voltage enough to cause armature 270 to rise and bring contact 280 into contact with terminal 281, whereupon the air control valve of the "stop" valve SV and "caution" valve CV are held up by reason of the energization of their magnets from current supplied by the generator. The engineer continues to hold lever 195 of the alert valve until he reaches (at a speed not exceeding that permitted by the low speed governor LS), the first high speed rail 71, whereupon the right hand track-affected magnet 20 will be released (because of the non-magnetic character of the rail 71) and its counter-weight will move it to its upper position and the several "stop" magnets, "caution" magnets and "clear" magnets will descend to a position where they will be within the influence of the track element. If the engine speed is very low these parts will be automatically restored to running position before the low speed rail is reached but will be again re-actuated because of the non-magnetic character of the low speed rail. Even if the speed is approximating the speed permitted by the low speed governor LS the magnets (because of the time required to raise them) may still be within the influence of the next track element TE when that track element is reached and if the signal is "clear" the "clear" head 82 is elevated and "clear" magnet 23 will be drawn downwardly by the magnetic flux so as to close contact between terminals 250 and 251, thus establishing the circuit 250, 251, 258, 220, generator 200, 202, 203, 205, 206, 269, 270, 271, 272, 273, 274, 283, 280, 281, 282, 256, the coil 173 of the release valve RV, 255, 254, 253, 252, thereby energizing the magnet of the release valve RV and shifting valve 169 so as to connect pipe 166 with release valve reservoir 175 and admit the pressure therefrom into cylinders 162 and 164 so as to carry valves 145 and 146 to the positions shown in Fig. 4, thus placing the parts in condition for normal running at full speed and under the magnetic control of my apparatus.

The engineer may now, and only now, let go of the alert valve lever 195. If by chance the first track element should have its "caution" head or "stop" head in active position the operation resulting would be that which will be described in connection with "caution" and "stop" actuations.

As soon as the "clear" head has been passed the "clear" circuit will be broken at terminal 250, magnet 173 will be deenergized, and valve 169 will be returned to its normal running position by spring 170, thus exhausting the pressure in cylinders 162 and 164 to atmosphere through port 168. It will of course be understood that, if the running speed is below that which will make generator 200 effective, the above-mentioned circuit will be supplied from battery B, passing from terminal 231 to terminal 280 and thence through 283 to the battery. The adjustment of 200 may bring it into action considerably below the maximum speed permitted by LS.

*A caution application*

As the engine proceeds along the track there will be a release of the track-affected magnet each time one of the non-magnetic rail sections 71 and 73 is passed and each time the "stop" magnet, the "caution" magnet and the "clear" magnet will descend into positions ready to be affected by the adjacent track element, being restored to their running positions automatically in due course by the timed operation of reset pistons 36. If a block signal be set at "caution", the "caution" head 81 of the adjacent track element will have been raised and the corresponding "clear" head will have been lowered. Consequently, as the engine passes this track element, the "caution" magnet 22 will be drawn downwardly and terminal 235 will be momentarily separated from terminal 236. This will break the normally closed circuit 236, 237, 235′, 236′, 240, the coil of the caution valve CV, 241, 229, battery B, 283, 280, 282, 231, 238, 235, thus releasing, momentarily, the valve 156 of the "caution" valve and permitting train line air pressure to be exhausted into cylinder 148 so as to act upon piston 147. The movement of piston 147 to the right shifts valve 145 so as to open communication between train line pressure and chamber 135 of the restricted speed governor RS. If the speed of the engine is greater than the maximum for which this governor is set, the friction of the shoes 128 thereof upon ring 129 will cause finger 131 to open one of the valves 133 and thus permit train line pressure to exhaust to atmosphere through the port normally covered thereby, thereby making a service application of the brakes sufficient to reduce the speed to the speed for which the restricted speed governor is set. As soon as the speed of the train has been reduced to this amount the spring 134 will operate to close valve 133, thus closing communication between train line pressure and atmosphere and permitting automatic release of the brakes in the ordinary manner as a result of accumulation of pressure in the train line. The train may now proceed, at any speed less than that for which the restricted speed governor RS has been set, but the moment that speed is exceeded there will be another application of the brakes as a result of the automatic opening of valve 133. "Stop", "caution" and "clear" magnet carriers when released move fairly rapidly to their lowest position and are returned somewhat more slowly.

*Resumption of running speed*

If, after a "caution" application, the next block signal is set at "clear", "clear" head 82 will affect the "clear" magnet 23 so as to close the release valve circuit at 250—251 and pressure will be admitted to cylinder 162 so as to return valve 145 to its running position where it closes communication between cylinder 140 and pipe 142, thus cutting out the restricted speed governor and restoring the parts to running condition.

*A stop application*

If a block signal is set at "stop" both the "stop" head 80 and the "caution" head 81 will be up and consequently both the "caution" magnet and the "stop" magnet will be affected.

Referring for the present to the effect upon the "stop" magnet, it will be noted that when this magnet comes within the range of the "stop" head 80 it will be drawn downwardly so as to separate terminal 225 from 226 and this will serve to break the following circuit:

226, 227, 225′, 226′, 228, the coil of the magnet of the "stop" valve SV, 229, battery B (or 220, 200, 202, 203, 205, 206, 269, 270, 271, 272, 273, 274), 283, 280, 281, 282, 231, 230, 225. Consequently the air valve of the stop valve SV will be released and admit pressure to the left hand side of piston 149, thus moving valve 146 from the port to pipe 143 and permitting train line pressure to be exhausted to atmosphere through port 191 of the alert valve AV, thus making a "stop" application of the brakes unless the engineer swings lever 195 of the alert valve into position to break communication with atmosphere and connect pipe 143 with pipe 144, whereupon the train comes within the control of the low speed governor LS, subject however to the constant care of the engineer because, the moment the engineer releases the alert valve lever 195, there will be an immediate "stop" application of the brakes. After receiving a "stop" application, however, the engineer may proceed, under the perfectly safe speed determined by the setting of the low speed governor so far as he finds the track clear.

The train is therefore under complete control of the engineer so long as he stays within the limits which have been fixed by the adjustments of the low speed governor, but the moment he exceeds those speeds the control of the train passes beyond him. Procedure under these conditions, however involves the constant attention of the engineer because he must constantly hold the lever 195 of the alert valve in position to prevent direct connection between train line pressure and atmosphere through port 191.

Should the engineer tie lever 195 in position to hold valve 190 to block port 191, he places his train under control of the low speed governor and of course he can do no damage at this speed.

I wish at this point to call special attention to the function and the value of the function of the alert valve. I am aware that heretofore in several of the automatic train control systems, it has been possible for the engineer to proceed after having received an automatic "stop" signal but, so far as I am aware all of those devices have required that the engine first shall have come to a full stop, it generally being necessary for the engineer to leave his driving post and proceed along the ground to some point where he can manipulate some element to release the mechanism and permit continued forward movement.

In my present construction it will be noted that the engineer, immediately upon receipt of an automatic "stop" application (which he will hear by reason of the exhaust through port 191), may promptly grasp the alert valve lever 195 and proceed at the reduced speed determined by the low speed governor. He may not cause a movement of his train in excess of the speed determined by the setting of the low speed governor because immediately upon the establishment of connection with the low speed governor through the alert valve, there will be an opening through valve 133 from train line pressure to atmosphere so long as the speed of the train exceeds the amount for which the low speed governor has been set.

It will be appreciated, from the above, that, if the engineer sees the "stop" signal in time, and makes ordinary service application of his brakes through the engineer's brake valve and brings his train to a speed at or below the speed permitted by the low speed governor before he reaches the track element which would cause an automatic "stop" application of the brakes he may proceed without stopping, but he can only do this by operating the alert valve at a proper time with relation to the time of arrival at the track element which would otherwise cause the automatic "stop" application of the brakes and he must continue to hold the alert valve lever if he wishes to proceed. To stop, he has merely to release lever 195.

The consequence is that the train has a flexibility of control which has not heretofore been possessed by trains under control of previous automatic mechanisms and the engineer is permitted, under proper and continuously active restrictions, to proceed as promptly as possible as far as possible and thus keep the track as clear as possible in view of traffic conditions. The terminals 209, 209', 219 and 219' may be engaged by an actuator 300 connected in any suitable manner to the reversing gear of the engine so that terminals 209 and 219 will contact with terminals 210 and 218 respectively when the engine is moving forwardly and terminals 209' and 219' will contact with terminals 210' and 218' respectively when the engine is moving backwardly.

In Fig. 17 I show the actuator 300 as carried by a shaft 305 provided with an arm 306 which is connected by a link 307 with the reversing lever 308.

The description of operation has assumed that the engine is moving forwardly; this description applies with equal force substituting primed reference numerals, for rearward movement.

In the claims I use the term "engine" to indicate any wheeled load-carrying motive unit equipped with an air brake apparatus.

The track element shown in Figs. 11 and 12 forms an insulated rail joint in the train track, the signal circuit, incorporating said track, passing through the stop head 80 to the track relay of the block to which it is connected. (See Figs. 11 and 12 where a rail section 70 is shown as part of the track element TE).

If, for any reason, either lack of speed of the engine or failure of driving connection of the generator, or any break in the generator circuit, or any defect in the generator circuit, the generator 200 fails to produce sufficient current to hold armature 207 in the position indicated in Fig. 16, the contact at 271 will be broken and the circuits to the magnets of the "stop" valve SV and the "caution" valve CV will be momentarily broken, thus admitting train line pressure to the left hand ends of cylinders 148 and 150, thereby shifting valves 145 and 146 so as to open communication between train line pressure and the restricted speed governor RS and between train line pressure and the low speed governor LS through the alert valve AV. This will immediately cause a "stop" application of the brakes because of release of train line pressure through port 191 of the alert valve, but the engineer, as previously described may, by holding the alert valve lever 195, proceed at low speed to a point where the necessary repairs can be made.

I claim as my invention:

1. The combination with an engine, of a magnet arranged within the magnetic influence of a magnetic element arranged alongside the line of travel of the engine, a second magnet carried by the engine, air pressure means for moving said second magnet to and from a position operatively related to a second magnetic element arranged alongside the travel of the engine, and a valve associated with the air brake system and operated by the movement of said first mentioned magnet controlling flow of air brake system air to said air pressure means.

2. The combination with an engine of a movable magnet arranged adjacent and within the magnetic influence of the rail upon which the engine operates, a second magnet carried by the engine, air pressure means for moving said second magnet to and from a position operatively related to a second magnetic element arranged alongside the travel of the engine, and a valve associated with the train line of the brake system and connected to the first-mentioned magnet so as to partake of the movement thereof, said valve controlling flow of air-brake-system-air to said air pressure means.

3. In an engine control, the combination of the engine, a reciprocable magnet arranged within the magnetic influence of a ground-supported magnetic element, a second magnet carried by the engine, air pressure means for moving said second magnet to and from a position operatively related to a second magnetic element arranged alongside the travel of the engine, means yieldingly acting on said first-mentioned magnet to retract it from such magnetic element, and a valve associated with the brake system of the engine and partaking of the movement of the first-mentioned magnet, said valve controlling flow of air-brake-system-air to said air pressure means.

4. In an engine control, the combination of the engine, a reciprocable magnet arranged within the magnetic influence of a ground-supported magnetic element, a second magnet carried by the engine, air pressure means for moving said second magnet to and from a position operatively related to a second magnetic element arranged alongside the travel of the engine, means yieldingly acting on said first-mentioned magnet to retract it from such magnetic element, said means comprising a counterweight acting upon the first-mentioned magnet in opposition to the magnetic drag on said magnet by the ground-supported magnetic element, and a valve associated with the brake system of the engine and partaking of the movement of the first-mentioned magnet, said valve controlling flow of air-brake-system-air to said air pressure means.

5. The combination with an engine, of a magnet arranged within the magnetic influence of a magnetic element arranged alongside the line of travel of the engine, a valve associated with the air brake system and operated by the movement of said magnet, and a delayed-action reset for said magnet comprising a piston arranged to act upon said magnet in the resetting direction, and a cylinder associated with said piston and having a restricted connection with the engine train line through the medium of said valve.

6. The combination with an engine, of a movable magnet arranged adjacent and within the magnetic influence of the rail upon which the engine operates, a valve associated with the train line of the brake system and connected to the magnet so as to partake of the movement thereof, and a delayed-action reset for said magnet comprising a piston arranged to act upon said magnet in the resetting direction, and a cylinder associated with said piston and having a restricted connection with the engine train line through the medium of said valve.

7. In an engine control, the combination of the engine, a reciprocable magnet arranged within the magnetic influence of a ground-supported magnetic element, means yieldingly acting on said magnet to retract it from such magnetic element, a valve associated with the brake system of the engine and partaking of the movement of the magnet, said means comprising a counterweight acting upon the magnet in opposition to the magnetic drag on said magnet by the ground-supported magnetic element, and a delayed-action reset for said magnet comprising a piston arranged to act upon said magnet in the resetting direction, and a cylinder associated with said piston and having a restricted connection with the engine train line through the medium of said valve.

8. In an engine controller a magnet carrier vertically reciprocably mounted on the engine, a magnet vertically movably mounted in said carrier, an electric circuit opened and closed by movement of the magnet in its carrier, and means by which said carrier may be shifted towards and from the magnetic influence of a ground-supported magnetic element, said means comprising a cylinder and piston associated with the carrier to produce the described movement thereof and means to control the flow of air brake system air to and from said cylinder.

9. In an engine controller, the combination of the engine, a magnet carrier mounted thereon, air-brake-system-air-pressure means by which said carrier may be moved to and from active position, a magnet reciprocably mounted in said carrier, and an electric circuit comprising separable terminals one of which is under control of movement of the magnet relative to its carrier.

10. As an element of an engine controller, a support, a magnet carrier movably mounted on said support, air-brake-system-air-pressure means by which said carrier may be reciprocated on its support, a magnet reciprocably mounted on the carrier, and means yieldingly holding the magnet in one position in the carrier.

11. As an element of an engine controller, a support, a magnet carrier movably mounted on said support, air-brake-system-air-pressure means by which said carrier may be reciprocated on its support, a magnet reciprocably mounted on the carrier, means yieldingly holding the magnet in one position in the carrier, and circuit terminals carried by the carrier and one movable relative to the other by movement of the magnet in the carrier.

12. In an engine controller, a magnet movably mounted, means yieldingly holding said magnet in normal position, an air valve controlled by the movement of said magnet, a second magnet, means controlled by the air valve for moving said second magnet towards and from active position, two terminals one movable relative to the other, and means controlled by movement of the second magnet other than that controlled by the air valve for moving one terminal relative to the other.

13. In an engine controller, a magnet movably mounted, means yieldingly holding said magnet in normal position, an air valve controlled by the movement of said magnet, means controlled by said valve for resetting the magnet to its normal position, a second magnet, means controlled by the air valve for moving said second magnet towards and from active position, two terminals one movable relative to the other, and means controlled by movement of the second magnet other than that controlled by the air valve for moving one terminal relative to the other.

14. As an element in an engine control, a magnet, air-brake-system-air-pressure means by which said magnet may be moved towards and from active position, other means supporting said magnet and permitting supplemental movement thereof, two electrical terminals, one movable relative to the other and both partaking of the primary movement of the magnet, and means controlled by the supplemental movement of the magnet for moving one terminal relative to the other.

15. In an engine controller, a magnet, means by which said magnet is reciprocably supported, means by which said magnet is yieldingly held in normal position, a valve chamber adapted to be connected to train line pressure of the engine, a valve in said chamber and partaking of the movements of the magnet, a second magnet, fluid pressure means by which said second magnet may be moved towards and from active position, fluid pressure connections with said fluid pressure means and controlled by said valve, means permitting supplemental movement of said second magnet, and a control element partaking of both the primary and supplemental movements of the magnet.

16. In an engine controller a vertically reciprocable track-affected magnet, means by which said track-affected magnet may be supported within the magnetic field of the engine track, means by which said magnet is yieldingly held in normal position, a valve chamber adapted to be connected to the train line of the engine, a valve in said chamber and partaking of the movements of the magnet, a vertically movable magnet carrier, a fluid pressure chamber communicating with the valve chamber through the medium of the valve, a piston in said last-mentioned fluid pressure chamber and supporting the magnet carrier, a magnet movably mounted in the magnet carrier for movement therewith and supplemental movement relative thereto, and a controller element partaking of the supplemental movement of the second magnet.

17. In an engine controller a vertically reciprocable track-affected magnet, means by which said track-affected magnet may be supported within the magnetic field of the engine track, a counterweight by which said magnet is yieldingly held in normal position, a valve chamber adapted to be connected to the train line of the engine, a valve in said chamber and partaking of the movements of the magnet, a vertically movable magnet carrier, a fluid pressure chamber communicating with the valve chamber through the medium of the valve, a piston in said last-mentioned fluid pressure chamber and supporting the magnet carrier, a magnet movably mounted in the magnet carrier for movement therewith and supplemental movement relative thereto, and a controller element partaking of the supplemental movement of the second magnet.

18. In an engine controller a vertically reciprocable track-affected magnet, means by which said track-affected magnet may be supported within the magnetic field of the engine track, means by which said magnet is yieldingly held in normal position, a valve chamber adapted to be connected to the train line of the engine, a valve in said chamber and partaking of the movements of the magnet, a fluid pressure chamber having a restricted connection with the valve chamber through the valve, a piston mounted in said chamber and adapted to act upon the magnet in resetting direction, a vertically movable magnet carrier, a fluid pressure chamber communicating with the valve chamber through the medium of the valve, a piston in said last-mentioned fluid pressure chamber and supporting the magnet carrier, a magnet movably mounted in the magnet carrier for movement therewith and supplemental movement relative thereto, and a controller element partaking of the supplemental movement of the second magnet.

19. In an engine controller a vertically reciprocable track-affected magnet, means by which said track-affected magnet may be supported within the magnetic field of the engine track, a counterweight by which said magnet is yieldingly held in normal position, a valve chamber adapted to be connected to the train line of the engine, a valve in said chamber and partaking of the movements of the magnet, a fluid pressure chamber having a restricted connection with the valve chamber through the valve, a piston mounted in said chamber and adapted to act upon the magnet in resetting direction, a vertically movable magnet carrier, a fluid pressure chamber communicating with the valve chamber through the medium of the valve, a piston in said last-mentioned fluid pressure chamber and supporting the magnet carrier, a magnet movably mounted in the magnet carrier for movement therewith and supplemental movement relative thereto, and a controller element partaking of the supplemental movement of the second magnet.

20. In an engine controller a vertically reciprocable track-affected magnet, means by which said track-affected magnet may be supported within the magnetic field of the engine track, means by which said magnet is yieldingly held in normal position, a valve chamber adapted to be connected to the train line of the engine, a valve in said chamber and partaking of the movements of the magnet, a vertically movable magnet carrier, a fluid pressure chamber communicating with the valve chamber through the medium of the valve, a piston in said last-mentioned fluid pressure chamber and supporting the magnet carrier, a magnet movably mounted in the magnet carrier for movement therewith and supplemental movement relative thereto, and a pair of electrical terminals carried by the carrier and one movable relative to the other, said movable terminal partaking of the supplemental movement of the second magnet.

21. In an engine controller a vertically reciprocable track-affected magnet, means by which said track-affected magnet may be supported within the magnetic field of the engine track, a counterweight by which said magnet is yieldingly held in normal position, a valve chamber adapted to be connected to the train line of the engine, a valve in said chamber and partaking of the movements of the magnet, a vertically movable magnet carrier, a fluid pressure chamber communicating with the valve chamber through the medium of the valve, a piston in said last-mentioned fluid pressure chamber and supporting the magnet carrier, a magnet movably mounted in the magnet carrier for movement therewith and supplemental movement relative thereto, and a pair of electrical terminals carried by the carrier and one movable relative to the other, said movable terminal partaking of the supplemental movement of the second magnet.

22. In an engine controller a vertically reciprocable track-affected magnet, means by which said track-affected magnet may be supported within the magnetic field of the engine track, means by which said magnet is yieldingly held in normal position, a valve chamber adapted to be connected to the train line of the engine, a valve in said chamber and partaking of the movements of the magnet, a fluid pressure chamber having a restricted connection with the valve chamber through the valve, a piston mounted in said chamber and adapted to act upon the magnet in resetting direction, a vertically movable magnet carrier, a fluid pressure chamber communicating with the valve chamber through the medium of the valve, a piston in said last-mentioned fluid pressure chamber and supporting the magnet carrier, a magnet movably mounted in the magnet carrier for movement therewith and supplemental movement relative thereto, and a pair of electrical terminals carried by the carrier and one movable relative to the other, said movable terminal partaking of the supplemental movement of the second magnet.

23. In an engine controller a vertically reciprocable track-affected magnet, means by which said track-affected magnet may be supported within the magnetic field of the engine track, a counterweight by which said magnet is yieldingly held in normal position, a valve chamber adapted to be connected to the train line of the engine, a valve in said chamber and partaking of the movements of the magnet, a fluid pressure chamber having a restricted connection with the valve chamber through the valve, a piston mounted in said chamber and adapted to act upon the magnet in resetting direction, a vertically movable magnet carrier, a fluid pressure chamber communicating with the valve chamber through the medium of the valve, a piston in said last-mentioned fluid pressure chamber and supporting the magnet carrier, a magnet movably mounted in the magnet carrier for movement therewith and supplemental movement relative thereto, and a pair of electrical terminals carried by the carrier and one movable relative to the other, said movable terminal partaking of the supplemental movement of the second magnet.

24. In an engine controller, the combination of an engine and a supporting track therefor comprising magnetic and non-magnetic portions, a track-affected magnet carried by the engine and normally within the magnetic range of the magnetic portions of the track, means yieldingly urging said magnet away from the track, a valve chamber connected to the engine train line, a valve in said chamber controlling an exhaust therefrom, a second magnet carried by the engine and movable towards and from active position, means controlled by movement of the first magnet for moving said second magnet towards and from active position, a magnetic element arranged adjacent the track, and means by which said magnetic element may be moved into and out of active position relative to the second magnet.

25. In an engine controller, the combination of an engine and a supporting track therefor comprising magnetic and non-magnetic portions, a track-affected magnet carried by the engine and normally within the magnetic range of the magnetic portions of the track, means yieldingly urging said magnet away from the track, a valve chamber connected to the engine train line, a valve in said chamber controlling an exhaust therefrom, a second magnet carried by the engine and movable towards and from active position, means controlled by movement of the first magnet for moving said second magnet towards and from active position, a magnetic element arranged adjacent the track, and means by which said magnetic element may be moved into and out of active position relative to the second magnet and means controlled by movement of the first magnet for propelling said first magnet to normal position.

26. In an engine controller the combination of an engine, a track therefor comprising magnetic and non-magnetic portions, a track-affected magnet, a casing therefor within the magnetic range of the track, means for movably supporting the track-affected magnet within the casing and permitting movement thereof towards and from the track, means yieldingly urging the track-affected magnet away from the track, a valve chamber communicating with the train line, a valve in said chamber controlling exhaust therefrom, a magnet carrier, air pressure means controlled by the valve for moving the carrier towards and from active position, a second magnet mounted in said magnet carrier and movable relative thereto under magnetic flux, means for yieldingly holding said second magnet in normal position in its carrier, and a control element under control of the supplemental movement of the magnet.

27. In an engine controller the combination of an engine, a track therefor comprising magnetic and non-magnetic portions, a track-affected magnet, a casing therefor within the magnetic range of the track, means for movably supporting the track-affected magnet within the casing and permitting movement thereof towards and from the track, means yieldingly urging the track-affected magnet away from the track, a valve chamber communicating with the train line, a valve in said chamber controlling exhaust therefrom, a magnet carrier, air pressure means controlled by the valve for moving the carrier towards and from active position, a second magnet mounted in said magnet carrier and movable relative thereto under magnetic flux, means for yieldingly holding said second magnet in normal position in its carrier, a fluid pressure chamber having a restricted connection with the valve chamber through the medium of the valve, and a piston mounted in said chamber and capable of engaging the first magnet in a reset direction and a control element under control of the supplemental movement of the magnet.

28. In an engine controller the combination of a shaft rotated by engine transportation, centrifugal friction shoes carried thereby, an oscillatory friction element engaged by said shoes, an air chamber adapted to be connected with the train line pressure and ported to atmosphere, and a valve normally closing said port and unseated by the oscillatory element.

29. In an engine controller the combination of a shaft rotated by engine transportation, centrifugal friction shoes carried thereby, an oscillatory friction element engaged by said shoes, an air chamber adapted to be connected to train line and double ported to atmosphere, and two oppositely set normally seated valves at said ports and engaged in opposite directions by the oscillating element.

30. In an engine controller an alert valve comprising a main body ported to atmosphere, to train line, and to a speed governor, a valve mounted in said body and ported to connect the train line either with the atmosphere or the governor, means normally yieldingly urging and holding said valve in position to port to atmosphere, and a manual element by which said valve may be shifted to governor-porting position.

31. In an engine controller the combination of the engine, a speed controlled governor actuated by transportation of the engine, a train line connection ported to atmosphere, a valve normally controlling said port and under the control of the governor, and an alert valve in the train line connection between train line pressure and the governor and ported to atmosphere, means for normally and yieldingly moving and holding the alert valve to atmosphere-porting position, and a manual actuator by which said alert valve may be moved from atmosphere-porting position to governor connecting position.

32. In an engine controller the combination of the engine, centrifugal friction shoes carried by a rotating shaft of said engine, an oscillating friction element engaged by said shoes, an air pressure chamber ported to atmosphere, a valve normally closing said port and engaged by the oscillating friction element, a connection between said air pressure chamber and train line, and an alert valve in said connection, said alert valve normally porting the train line connection to atmosphere ahead of the governor pressure chamber and movable to connect the train line connection to the governor pressure chamber, means for normally yieldingly urging and holding the alert valve in atmosphere porting position, and a manually movable lever by which the alert valve may be shifted to connect the train line with the governor pressure chamber.

33. In an engine controller the combination of the engine, a restricted speed governer comprising a chamber ported to atmosphere, a valve normally closing said port, and a speed controlled engine-driven element acting on said valve, a connection between said port and train line, said connection comprising a valve movable to and from train line connecting position, air pressure means for shifting said valve to and from position to establish connection between the train line and the governor pressure chamber, and a valve for controlling flow of train line pressure to said air pressure means.

34. In an engine controller the combination of the engine, a restricted speed governor comprising a chamber ported to atmosphere, a valve normally closing said port, and a speed controlled engine driven element acting on said valve, a connection between said port and train line, said connection comprising a valve movable to and from train line connecting position, air pressure means for shifting said valve to and from position to establish connection between the train line and the governor pressure chamber, and a magnetic valve for controlling flow of train line pressure to said air pressure means.

35. In an engine controller the combination of the engine, a restricted speed governor comprising a chamber ported to atmosphere, a valve normally closing said port, and a speed controlled engine driven element acting on said valve, a connection between said port and train line, said connection comprising a valve movable to and from train line connecting position, air pressure means for shifting said valve to and from position to establish connection between the train line and the governor pressure chamber, a valve for controlling flow of train line pressure to said air pressure means, and a second magnetic valve controlling flow of pressure from train line to said air pressure valve operating means.

36. In an engine controller the combination of the engine, a restricted speed governor comprising a chamber ported to atmosphere, a valve normally closing said port, and a speed controlled engine driven element acting on said valve, a connection between said port and train line, said connection comprising a valve movable to and from train line connecting position, air pressure means for shifting said valve to and from position to establish connection between the train line and the governor pressure chamber, a magnetic valve for controlling flow of train line pressure to said air pressure means, and a second magnetic valve controlling flow of pressure from train line to said air pressure valve operating means.

37. In an engine controller the combination of the engine, a restricted speed governor comprising a chamber ported to atmosphere, a valve normally closing said port, and a speed controlled engine driven element acting on said valve, a connection between said port and train line, said connection comprising a valve movable to and from train line connecting position, air pressure means for shifting said valve to and from position to establish connection between the train line and the governor pressure chamber, a valve for controlling flow of train line pressure to said air pressure means, a low speed governor comprising a chamber ported to atmosphere, a valve normally closing said port, and a centrifugal speed-controlled engine-driven element acting on said valve, a connection between said chamber and train line pressure, an alert valve in said connection and movable to either port said connection to atmosphere or establish said connection with the low speed governor pressure chamber, means by which said alert valve is yieldingly urged and normally held in atmosphere porting position, an arm by which said valve may be manually shifted to position establishing connection between train line and the low speed governor pressure chamber, a valve arranged between the alert valve and train line pressure, pressure controlled means for shifting said valve, and a valve arranged between train line pressure and said pressure operated means.

38. In an engine controller the combination of the engine, a restricted speed governor comprising a chamber ported to atmosphere, a valve normally closing said port, and a speed controlled engine driven element acting on said valve, a connection between said port and train line, said connection comprising a valve movable to and from train line connecting position, air pressure means for shifting said valve to and from position to establish connection between the train line and the governor pressure chamber, a valve for controlling flow of train line pressure to said air pressure means, a low speed governor comprising a chamber ported to atmosphere, a valve normally closing said port, and a centrifugal speed-controlled engine-driven element acting on said valve, a connection between said chamber and train line pressure, an alert valve in said connection and movable to either port said connection to atmosphere to establish said connection with the low speed governor pressure chamber, means by which said alert valve is yieldingly urged and normally held in atmosphere porting position, an arm by which said valve may be manually shifted to position establishing connection between train line and the low speed governor pressure chamber, a valve arranged between the alert valve and train line pressure, pressure controlled means for shifting said valve, a valve arranged between train line pressure and said pressure operated means, and a second valve arranged between train line pressure and said last-mentioned pressure controlled means.

39. In an engine controller the combination of the engine, a restricted speed governor comprising a chamber ported to atmosphere, a valve normally closing said port, and a speed controlled engine driven element acting on said valve, a connection between said port and train line, said connection comprising a valve movable to and from train line connecting position, air pressure means for shifting said valve to and from position to establish connection between the train line and the governor pressure chamber, a magnetic valve for controlling flow of train line pressure to said air pressure means, a low speed governor comprising a chamber ported to atmosphere, a valve normally closing said port, and a centrifugal speed-controlled engine-driven element acting on said valve, a connection between said chamber and train line pressure, an alert valve in said connection and movable to either port said connection to atmosphere or establish said connection with the low speed governor pressure chamber, means by which said alert valve is yieldingly urged and normally held in atmosphere porting position, an arm by which said valve may be manually shifted to position establishing connection between train line and the low speed governor pressure chamber, a valve arranged between the alert valve and train line pressure, pressure controlled means for shifting said valve, and a valve arranged between train line pressure and said pressure operated means.

40. In an engine controller the combination of the engine, a restricted speed governor comprising a chamber ported to atmosphere, a valve normally closing said port, and a speed controlled engine driven element acting on said valve, a connection between said port and train line, said connection comprising a valve movable to and from train line connecting position, air pressure means for shifting said valve to and from position to establish connection between the train line and the governor pressure chamber, and a magnetic valve for controlling flow of train line pressure to said air pressure means, a low speed governor comprising a chamber ported to atmosphere, a valve normally closing said port, and a centrifugal speed-controlled engine-driven element acting on said valve, a connection between said chamber and train line pressure, an alert valve in said connection and movable to either port said connection to atmosphere or establish said connection with the low speed governor pressure chamber, means by which said alert valve is yieldingly urged and normally held in atmosphere porting position, an arm by which said valve may be manually shifted to position establishing connection between train line and the low speed governor pressure chamber, a valve arranged between the alert valve and train line pressure, pressure controlled means for shifting said valve, a valve arranged between train line pressure and said pressure operated means, and a second valve arranged between train line pressure and said last-mentioned pressure controlled means.

41. In an engine controller the combination of the engine, a restricted speed governor comprising a chamber ported to atmosphere, a valve normally closing said port, and a speed controlled engine driven element acting on said valve, a connection between said port and train line, said connection comprising a valve movable to and from train line connecting position, air pressure means for shifting said valve to and from position to establish connection between the train line and the governor pressure chamber, a valve for controlling flow of train line pressure to said air pressure means, a second magnetic valve controlling flow of pressure from train line to said air pressure valve operating means, a low speed governor comprising a chamber ported to atmosphere, a valve normally closing said port, and a centrifugal speed-controlled engine-driven element acting on said valve, a connection between said chamber and train line pressure, an alert valve in said connection and movable to either port said connection to atmosphere or establish said connection with the low speed governor pressure chamber, means by which said alert valve is yieldingly urged and normally held in atmosphere porting position, an arm by which said valve may be manually shifted to position establishing connection between train line and the low speed governor pressure chamber, a valve arranged between the alert valve and train line pressure, pressure controlled means for shifting said valve, and a valve arranged between said train line pressure and said pressure operated means.

42. In an engine controller the combination of the engine, a restricted speed governor comprising a chamber ported to atmosphere, a valve normally closing said port, and a speed controlled engine driven element acting on said valve, a connection between said port and train line, said connection comprising a valve movable to and from train line connecting position, air pressure means for shifting said valve to and from position to establish connection between the train line and the governor pressure chamber, a valve for controlling flow of train line pressure to said air pressure means, a second magnetic valve controlling flow of pressure from train line to said air pressure valve operating means, a low speed governor comprising a chamber ported to atmosphere, a valve normally closing said port, and a centrifugal speed-controlled engine-driven element acting on said valve, a connection between said chamber and train line pressure, an alert valve in said connection and movable to either port said connection to atmosphere or establish said connection with the low speed governor pressure chamber, means by which said alert valve is yieldingly urged and normally held in atmosphere porting position, an arm by which said valve may be manually shifted to position establishing connection between train line and the low speed governor pressure chamber, a valve arranged between the alert valve and train line pressure, pressure controlled means for shifting said valve, a valve arranged between train line pressure and said pressure operated means, and a second valve arranged between train line pressure and said last-mentioned pressure controlled means.

43. In an engine controller the combination of the engine, a restricted speed governor comprising a chamber ported to atmosphere, a valve normally closing said port, and a speed controlled engine driven element acting on said valve, a connection between said port and train line, said connection comprising a valve movable to and from train line connecting position, air pressure means for shifting said valve to and from position to establish connection between the train line and the governor pressure chamber, a magnetic valve for controlling flow of train line pressure to said air pressure means, and a second magnetic valve controlling flow of pressure from train line to said air pressure valve operating means, a low speed governor comprising a chamber ported to atmosphere, a valve normally closing said port, and a centrifugal speed-controlled engine-driven element acting on said valve, a connection between said chamber and train line pressure, an alert valve in said connection and movable to either port said connection to atmosphere or establish said connection with the low speed governor pressure chamber, means by which said alert valve is yieldingly urged and normally held in atmosphere porting position, an arm by which said valve may be manually shifted to position establishing connection between train line and the low speed governor pressure chamber, a valve arranged between the alert valve and train line pressure, pressure controlled means for shifting said valve, and a valve arranged between train line pressure and said pressure operated means.

44. In an engine controller the combination of the engine, a restricted speed governor comprising a chamber ported to atmosphere, a valve normally closing said port, and a speed controlled engine driven element acting on said valve, a connection between said port and train line, said connection comprising a valve movable to and from train line connecting position, air pressure means for shifting said valve to and from position to establish connection between the train line and the governor pressure chamber, a magnetic valve for controlling flow of train line pressure to said air pressure means, a second magnetic valve controlling flow of pressure from train line to said air pressure valve operating means, a low speed governor comprising a chamber ported to atmosphere, a valve normally closing said port, and a centrifugal speed-controlled engine-driven element acting on said valve, a connection between said chamber and train line pressure, an alert valve in said connection and movable to either port said connection to atmosphere or establish said connection with the low speed governor pressure chamber, means by which said alert valve is yieldingly urged and normally held in atmosphere porting position, an arm by which said valve may be manually shifted to position establishing connection between train line and the low speed governor pressure chamber, a valve arranged between the alert valve and train line pressure, pressure controlled means for shifting said valve, a valve arranged between train line pressure and said pressure operated means, and a second valve arranged between train line pressure and said last-mentioned pressure controlled means.

45. A track element for engine controllers comprising two bodies of magnetic material, means by which said bodies may be alternately moved into or out of active position relative to the track, a third body of magnetic material, and means by which said third body may be independently moved into or out of active position relative to the track.

46. A track element for engine controllers comprising two magnetic bodies, means by which said two bodies may be alternately raised to or lowered from active position, and a third magnetic body and means by which said third magnetic body may be raised to or lowered from active position.

47. In a train controller, the combination of an engine, a low speed governor comprising an air pressure chamber ported to atmosphere, a valve normally closing said port, and a speed controlled governor driven by the engine and active upon said valve; an alert valve comprising a connection with train line, a connection with the governor pressure chamber, and a port to atmosphere and a movable member adapted to establish connection between the train line and atmosphere or train line and governor, means for normally urging and holding said movable member in position establishing connection between train line and atmosphere, and a manually operable element by which said movable member may be shifted to position to establish connection between train line pressure and governor; an engine shoe comprising a track-affected magnet movable into the magnetic field of the engine track, means for yieldingly urging said track-affected magnet away from said magnetic field, a pressure chamber connected with the train line, an engine shoe valve arranged in said chamber and controlling communication with atmosphere, a magnet carrier movable towards and from the track, air pressure means controlled by the engine shoe valve for raising and lowering said carrier, a magnet carried by said carrier and relatively movable thereon by magnetic flux acting on said magnet; an application valve controlling communication between train line and the alert valve; an air pressure actuator for said application valve, an electro-magnetic valve controlling communication between said actuator and train line, an electric circuit for said electro-magnetic valve controlled by movement of the second-mentioned magnet relative to its carrier; air pressure connections between said actuator and the valve chamber of the engine shoe through the valve thereof; a release valve controlling said connection; an electromagnet controlling said release valve, and electrical connections for said electro-magnet controlled by movement of the second-mentioned magnets of the engine shoe relative to its carrier.

48. In a train controller, the combination of an engine, a low speed governor comprising an air pressure chamber ported to atmosphere, a valve normally closing said port, and a speed controlled governor driven by the engine and active upon said valve; an alert valve comprising a connection with train line, a connection with the governor pressure chamber, and a port to atmosphere and a movable member adapted to establish connection between the train line and atmosphere or train line and governor, means for normally urging and holding said movable member in position establishing connection between train line and atmosphere, and a manually operable element by which said movable member may be shifted to position to establish connection between train line pressure and governor; an engine shoe comprising a track-affected magnet movable into the magnetic field of the engine track, means for yieldingly urging said track-affected magnet away from said magnetic field, a pressure chamber connected with the train line, an engine shoe valve arranged in said chamber and controlling communication with atmosphere, a plurality of magnet carriers movable towards and from the track, air pressure means controlled by the engine shoe valve for raising and lowering said carriers, a magnet carried by each of said carriers and relatively movable thereon by magnetic flux acting on said magnet; an application valve controlling communication between train line and the alert valve; an air pressure actuator for said application valve, an electro-magnetic valve controlling communication between said actuator and train line, an electric circuit for said electro-magnetic valve controlled by movement of one of the second-mentioned magnets relative to its carrier; a restricted speed governor comprising a pressure chamber ported to atmosphere, a valve normally closing said port, and a speed-controlled governor operated by the engine and active upon said valve, a second application valve controlling communication between the pressure chamber of the restricted speed governor and train line, an actuator for said second application valve, a normally open valve for controlling communication between train line and the actuator of the second application valve, an electro-magnet for holding said last-mentioned valve to its seat, an electrical circuit for said electro-magnet, controlled by the supplemental movements of one of the second-mentioned magnets of the engine shoe, air pressure connections between said actuators and the valve chamber of the engine shoe through the valve thereof; a release valve controlling said connections; an electro-magnet controlling said release valve, and electrical connections for said electro-magnet controlled by movement of one of the second-mentioned magnets of the engine shoe relative to its carrier.

49. In a train control, a speed-controlled governor having an air chamber, a valved connection between train line and said chamber, an alert valve between said valve and the governor chamber, said alert valve comprising an element normally biased to atmosphere-porting position, a pneumatic actuator for said first-mentioned valve, a magnetic valve controlling flow of actuating pressure to said actuator, a generator, a battery, an electric circuit leading to the magnetic valve and comprising a pair of separated terminals, a movable terminal, movable between said separated terminals and connected with the battery, and a relay controlled by the generator for moving said vibrating terminal from one separated terminal to the other so as to provide a momentary break in the circuit of the magnetic valve.

50. In a train control, a speed-controlled governor having an air chamber, a valved connection between train line and said chamber, an alert valve between said valve and the governor chamber, said alert valve comprising an element normally biased to atmosphere-porting position, a pneumatic actuator for said first-mentioned valve, a magnetic valve controlling flow of actuating pressure to said actuator, a generator, a battery, an electric circuit leading to the magnetic valve and comprising a pair of separated terminals, a movable terminal, movable between said separated terminals and connected with the battery, and a relay controlled by the generator for moving said movable terminal from one separated terminal to the other so as to provide a momentary break in the circuit of the magnetic valve, said relay being so proportioned as to affect the movable contact when a critical speed of the generator is reached.

In witness whereof, I have hereunto set my hand at Indianapolis, Indiana, this 21st day of July, A. D. one thousand nine hundred and twenty six.

JOHN E. STIEGELMEYER.